US012025463B2

(12) United States Patent
Yano et al.

(10) Patent No.: US 12,025,463 B2
(45) Date of Patent: Jul. 2, 2024

(54) SERVER, VEHICLE, DISTRIBUTED TRANSACTION VERIFICATION SYSTEM, AND DISTRIBUTED TRANSACTION VERIFICATION METHOD

(71) Applicant: PANASONIC INTELLECTUAL PROPERTY MANAGEMENT CO., LTD., Osaka (JP)

(72) Inventors: Takanao Yano, Kanagawa (JP); Nobuhiro Fukuda, Kanagawa (JP); Makoto Hinata, Kanagawa (JP); Norihiko Kobayashi, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 807 days.

(21) Appl. No.: 17/178,933

(22) Filed: Feb. 18, 2021

(65) Prior Publication Data

US 2021/0239492 A1 Aug. 5, 2021

Related U.S. Application Data

(63) Continuation of application No. PCT/JP2019/031842, filed on Aug. 13, 2019.

(30) Foreign Application Priority Data

Aug. 22, 2018 (JP) .................. 2018-155600

(51) Int. Cl.
*G01C 21/00* (2006.01)
*G05D 1/00* (2006.01)
(Continued)

(52) U.S. Cl.
CPC ..... *G01C 21/3833* (2020.08); *G01C 21/3807* (2020.08); *G05D 1/0214* (2013.01);
(Continued)

(58) Field of Classification Search
CPC ............ G01C 21/3833; G01C 21/3807; G06F 16/1734; G05D 1/0214; G05D 1/0276; G08G 1/096775; G07C 5/0816
See application file for complete search history.

(56) References Cited

U.S. PATENT DOCUMENTS

| | | | |
|---|---|---|---|
| 2017/0023945 A1 | 1/2017 | Cavalcanti et al. | |
| 2017/0032671 A1 | 2/2017 | Toyama et al. | |

(Continued)

FOREIGN PATENT DOCUMENTS

| | | |
|---|---|---|
| CN | 106133801 | 11/2016 |
| CN | 106407806 | 2/2017 |

(Continued)

OTHER PUBLICATIONS

Office Action issued by the China National Intellectual Property Administration (CNIPA) in Chinese Patent Application No. 201980054667.0, dated Jan. 25, 2024, together with an English language translation.

(Continued)

*Primary Examiner* — Aryan E Weisenfeld
(74) *Attorney, Agent, or Firm* — Greenblum and Bernstein, P.L.C.

(57) ABSTRACT

A server holds a blockchain in which transaction information related to an inspection of each of the plurality of vehicles is recorded in a chain manner; selects a target vehicle of inspection from the plurality of vehicles and adds transaction information related to an inspection of the selected target vehicle to the blockchain; and transmits an execution instruction of a transaction related to the inspection to the target vehicle. The server registers an inspection result in the added transaction information related to the inspection of the target vehicle based on an execution result of the transaction related to the inspection of the target vehicle based on the execution instruction and an execution (Continued)

result of a transaction related to the inspection of a peripheral vehicle other than the target vehicle.

20 Claims, 13 Drawing Sheets

(51) Int. Cl.
    *G06F 16/17*         (2019.01)
    *G08G 1/0967*      (2006.01)
    *G07C 5/08*         (2006.01)

(52) U.S. Cl.
    CPC ....... *G05D 1/0276* (2013.01); *G06F 16/1734* (2019.01); *G08G 1/096775* (2013.01); *G07C 5/0816* (2013.01)

(56) References Cited

U.S. PATENT DOCUMENTS

| | | | |
|---|---|---|---|
| 2017/0046958 A1 | 2/2017 | Naka et al. | |
| 2017/0075352 A1 | 3/2017 | Nordbruch | |
| 2017/0098371 A1 | 4/2017 | Ujiie et al. | |
| 2018/0091596 A1* | 3/2018 | Alvarez | ............. H04L 63/0428 |
| 2018/0139056 A1 | 5/2018 | Imai et al. | |
| 2018/0356236 A1 | 12/2018 | Lawrenson et al. | |
| 2019/0139334 A1 | 5/2019 | Sainaney et al. | |
| 2019/0149598 A1 | 5/2019 | Sawada et al. | |
| 2019/0334924 A1 | 10/2019 | Toyama et al. | |

FOREIGN PATENT DOCUMENTS

| | | | |
|---|---|---|---|
| DE | 112018002964 | 2/2020 | |
| JP | 2004-287500 | 10/2004 | |
| JP | 2007-066217 | 3/2007 | |
| JP | 2015230665 | * 6/2014 | ............. G08G 1/16 |
| JP | 2015-230665 | 12/2015 | |
| JP | 2016-105081 | 6/2016 | |
| JP | 2017-520815 | 7/2017 | |
| JP | 2018-017103 | 2/2018 | |
| JP | 2018-081464 | 5/2018 | |
| JP | 2019-091168 | 6/2019 | |
| WO | 2017/214713 | 12/2017 | |

OTHER PUBLICATIONS

Office Action from Japan Patent Office (JPO) in Japanese Patent Appl. No. 2018-155600, dated Nov. 2, 2021, together with an English language translation.

International Search Report (ISR) from International Searching Authority (Japan Patent Office) in International Pat. Appl. No. PCT/JP2019/031842, dated Nov. 19, 2019, together with an English language translation thereof.

Written Opinion (WO) from International Searching Authority (Japan Patent Office) in International Pat. Appl. No. PCT/JP2019/031842, dated Nov. 19, 2019, together with an English language translation thereof.

Office Action from German Patent and Trademark Office in German Patent Appl. No. 112019004199.1, dated Dec. 6, 2023, together with an English language translation.

* cited by examiner

St1: SELECT INSPECTION TARGET VEHICLE

St2: MEASURE EXTERNAL ENVIRONMENT INFORMATION

St3: REPORT RESULTS TO SERVER

St4: REWARD IS GRANTED

St71: VEHICLE CR1 DETECTS OBSTACLE

St72: INQUIRE OF FOLLOWING PERIPHERAL VEHICLES

St73: PERFORM UPDATE

St74: DESCRIBE RESULTS, GRANT REWARD

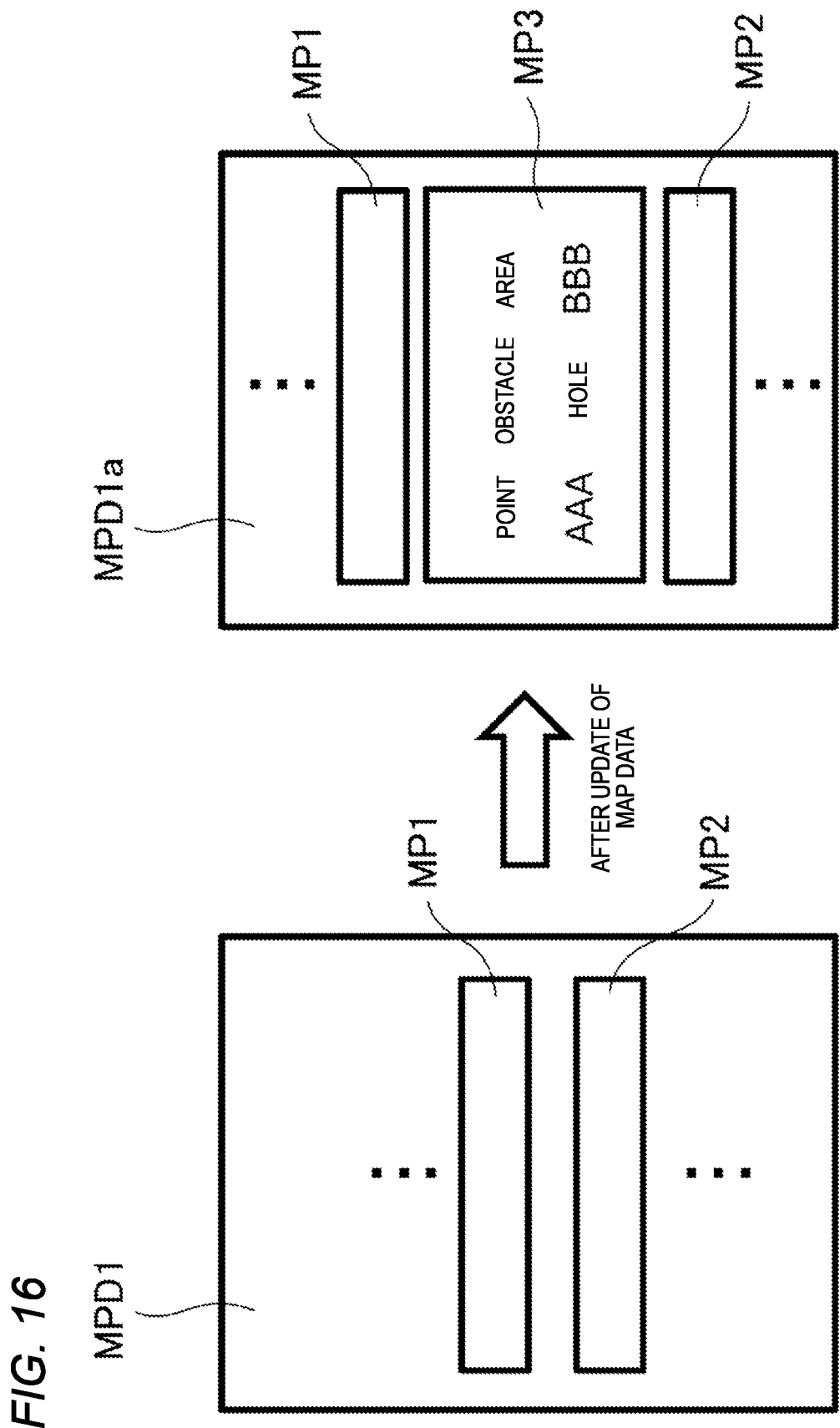

SERVER, VEHICLE, DISTRIBUTED TRANSACTION VERIFICATION SYSTEM, AND DISTRIBUTED TRANSACTION VERIFICATION METHOD

CROSS-REFERENCE TO RELATED APPLICATIONS

This application is a continuation of PCT International Patent Application No. PCT/JP2019/031842 filed on Aug. 13, 2019, which claims the benefit of priority of Japanese Patent Application No. 2018-155600 filed on Aug. 22, 2018, the entire contents of which are incorporated herein by reference.

FIELD

The present disclosure relates to a server, a vehicle, a distributed transaction verification system, and a distributed transaction verification method.

BACKGROUND

In recent years, self-driving vehicles capable of self-driving have become widespread. A plurality of sensors are mounted on such a self-driving vehicle so as to measure surrounding external environment information in real time during self-driving. The sensor may be, for example, a camera, a millimeter wave radar, a LiDAR (light detection and ranging, laser imaging detection and ranging), or a global navigation satellite system (GNSS) sensor. Various techniques that use such sensors to determine the external environment information have also been proposed, for example, as described in JP-A-2016-105081 and JP-A-2018-017103.

SUMMARY

In the self-driving vehicle, self-driving control is executed based on measurement results obtained by detection of the various sensors described above. Therefore, for example, if the sensor malfunctions during the self-driving, possibility of a traffic violation or a traffic accident increases. However, under a current automobile inspection and registration system (so-called vehicle inspection system), for example, a vehicle inspection period is set to every three years or two years for ordinary passenger cars, so it is difficult to anticipate measures to accelerate such a vehicle inspection period at present. Moreover, since it takes time to move the self-driving vehicle to a vehicle inspection site and perform inspection in a case where the sensor malfunctions or the like, the self-driving vehicle cannot be used during this time, and use efficiency is thus deteriorated.

The present disclosure is devised in view of the above-described conventional circumstances, and an object thereof is to provide a server, a vehicle, a distributed transaction verification system, and a distributed transaction verification method that manage an execution result of a transaction related to a malfunction inspection of sensors installed in each of a plurality of nearby vehicles and a detection result of presence or absence of any sensor malfunction, and accurately guarantee effectiveness of the transaction executed in each vehicle.

The present disclosure provides a server which constitutes a distributed transaction verification system including a plurality of vehicles, the server including: a memory configured to hold a blockchain in which transaction information related to an inspection of each of the plurality of vehicles is recorded in a chain manner; a processor configured to select a target vehicle of inspection from the plurality of vehicles and add transaction information related to an inspection of the selected target vehicle to the blockchain; and a communication circuit configured to transmit an execution instruction of a transaction related to the inspection to the target vehicle, wherein the processor registers an inspection result in the added transaction information related to the inspection of the target vehicle, the inspection result being based on an execution result of the transaction related to the inspection of the target vehicle based on the execution instruction and an execution result of a transaction related to the inspection of at least one peripheral vehicle other than the target vehicle.

The present disclosure also provides a vehicle which constitutes a distributed transaction verification system including a server, the vehicle including: a communication circuit configured to communicate with the server which holds a blockchain in which transaction information related to an inspection of the vehicle is recorded in a chain manner; and a control unit configured to control an operation including driving of a host vehicle, wherein if the host vehicle is selected as a target vehicle of an inspection, the communication circuit receives an execution instruction of a transaction related to the inspection, and the control unit controls execution of the transaction related to the inspection based on the execution instruction, and controls the operation including the driving of the host vehicle based on an inspection result, the inspection result being based on an execution result of the transaction related to the inspection of the host vehicle and an execution result of a transaction related to the inspection of another vehicle.

The present disclosure also provides a distributed transaction verification system in which a server and a plurality of vehicles are connected to communicate with each other, wherein the server holds a blockchain in which transaction information related to an inspection of each of the plurality of vehicles is recorded in a chain manner, and selects a target vehicle of inspection from the plurality of vehicles, creates transaction information related to an inspection of the selected target vehicle on the blockchain, and transmits an execution instruction of a transaction related to the inspection to the target vehicle, wherein the target vehicle executes the transaction related to the inspection based on the execution instruction, and transmits the execution instruction of the transaction related to the inspection to at least one peripheral vehicle other than the target vehicle, and wherein the server registers an inspection result based on an execution result of the transaction related to the inspection of each of the target vehicle and the at least one peripheral vehicle in the created transaction information related to the inspection of the target vehicle.

The present disclosure also provides a distributed transaction verification method using a distributed transaction verification system in which a server and a plurality of vehicles are connected to communicate with each other, the distributed transaction verification method including: a step of holding a blockchain in which transaction information related to an inspection of each of the plurality of vehicles is recorded in a chain manner; a step of selecting a target vehicle of inspection from the plurality of vehicles; a step of creating transaction information related to an inspection of the selected target vehicle on the blockchain and transmitting an execution instruction of a transaction related to the inspection to the target vehicle; a step of executing the transaction related to the inspection based on the execution instruction and transmitting the execution instruction of the transaction related to the inspection to at least one peripheral vehicle other than the target vehicle; and a step of registering an inspection result based on an execution result of the transaction related to the inspection of each of the target vehicle and the at least one peripheral vehicle in the created transaction information related to the inspection of the target vehicle.

Any combination of the above constituent elements and conversions of representations of the present disclosure between methods, devices, systems, recording media, computer programs and the like are also valid aspects of the present disclosure.

According to the present disclosure, the execution result of the transaction related to the malfunction inspection of the sensors installed in each of the plurality of nearby vehicles and the detection result of the presence or absence of any sensor malfunction can be managed, and the effectiveness of the transaction executed in each vehicle can be accurately guaranteed.

BRIEF DESCRIPTION OF DRAWINGS

FIG. 16 is an explanatory diagram showing an example of updating map data.

DETAILED DESCRIPTION

Figure 1:
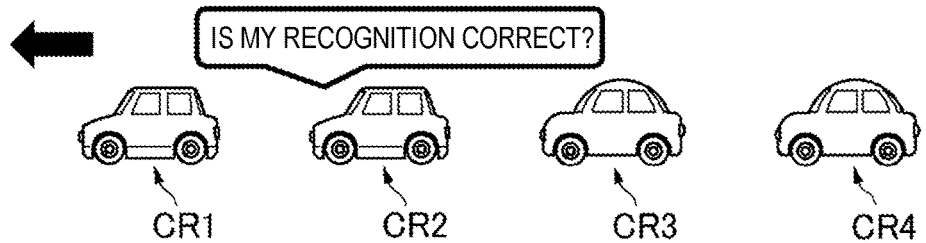
FIG. 1 is an explanatory diagram showing an operation outline example of a first use case of a distributed transaction verification system.
Figure 1:
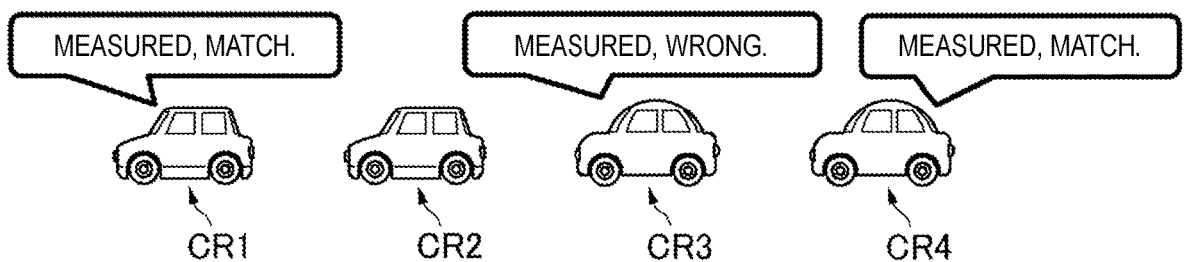
Figure 1:
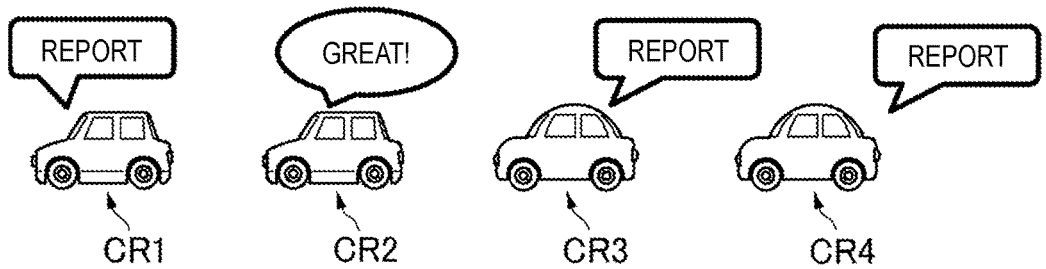
Figure 1:
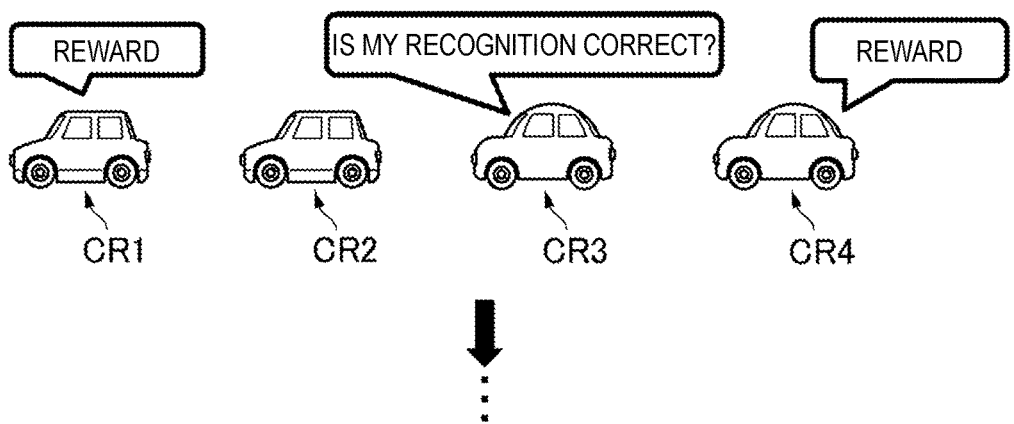

Hereinafter, embodiments in which configurations and operations of a server, a vehicle, a distributed transaction verification system, and a distributed transaction verification method according to the present disclosure are specifically disclosed will be described in detail with reference to the accompanying drawings as appropriate. However, unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to those skilled in the art to fully understand the present disclosure and are not intended to limit the subject matter described in the claims.

In Embodiment 1, two use cases are exemplified as use cases of the distributed transaction verification system.

In a first use case, the distributed transaction verification system holds and manages a blockchain in which transaction information related to an inspection of each of a plurality of vehicles is recorded in a chain manner, and selects an inspection target vehicle from the plurality of vehicles based on the blockchain. The distributed transaction verification system uses blockchain technology to determine an inspection result based on an execution result of a transaction related to the inspection of the target vehicle and other peripheral vehicles, and registers a result of the determination in the blockchain. As a result, according to the distributed transaction verification system, it is possible to prevent falsification of the execution result of the transaction related to the inspection of the target vehicle selected based on the blockchain from the plurality of nearby vehicles, and thus effectiveness of the inspection result of the target vehicle is ensured.

In a second use case, the distributed transaction verification system, in the same way as in the first use case, holds and manages the blockchain in which the transaction information related to the inspection of each of the plurality of vehicles is recorded in the chain manner. When any one of the vehicles detects an event (to be described later below), the distributed transaction verification system inquires of the other peripheral vehicles whether the same event can be detected, and newly registers data corresponding to the event in the blockchain when a majority of normal detection results are obtained. The distributed transaction verification system selects a vehicle that cannot be normally detected as the inspection target vehicle. Subsequent processing is the same as that of the first use case. As a result, according to the distributed transaction verification system, credibility of a detection result can be confirmed through using the plurality of nearby vehicles with the detection of the event serving as a trigger. Unregistered data which is not known until the detection of the event can be properly registered when presence of the credibility is obtained. Since it is also possible to prevent falsification of the execution result of the transaction related to the inspection of the target vehicle, the effectiveness of the inspection result of the target vehicle is ensured.

(First Use Case)

Figure 2:
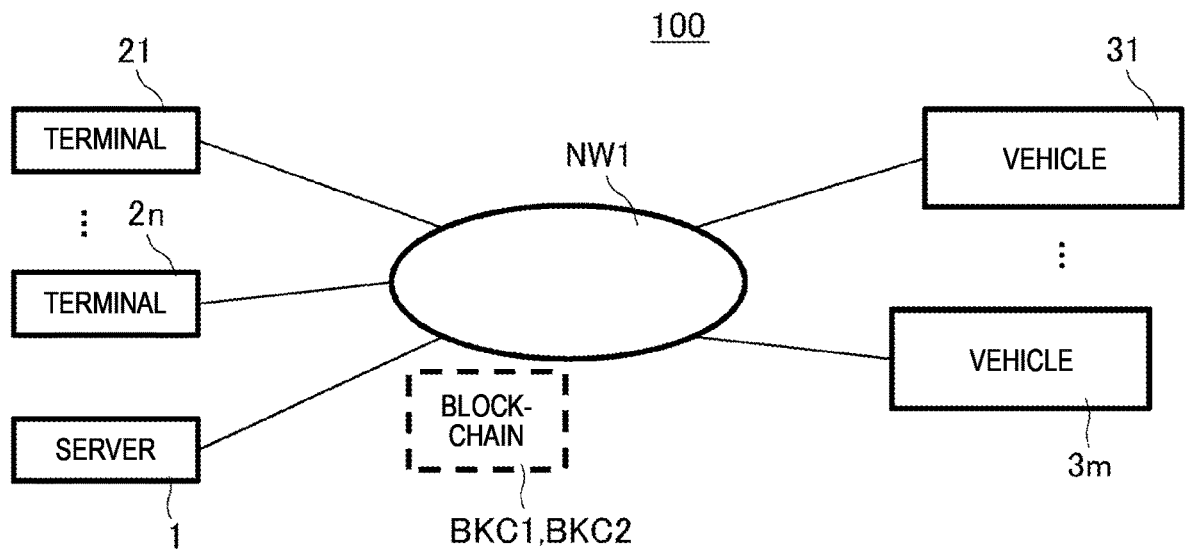
FIG. 2 shows a system configuration example of the distributed transaction verification system.

FIG. 1 is an explanatory diagram showing an operation outline of the first use case of a distributed transaction verification system 100. FIG. 2 shows a system configuration example of the distributed transaction verification system 100.

As will be described later below with reference to FIG. 2, a plurality of vehicles 31, . . . , 3m (m: an integer of 3 or more) participate in the distributed transaction verification system 100 according to Embodiment 1. Each of the vehicles 31 to 3m is a vehicle capable of self-driving, and is equipped with at least one sensor (see FIG. 4) capable of measuring external environment information around the vehicle so as to perform the self-driving.

If such a sensor malfunctions (for example, there is an abnormality such as a failure), possibility that the vehicle will cause a traffic violation or a traffic accident during the self-driving is increased. However, under a current automobile inspection and registration system (so-called vehicle inspection system), for example, a vehicle inspection period is set to every three years or two years for ordinary passenger cars, so it is difficult to anticipate measures to accelerate such a vehicle inspection period at present. Moreover, since it takes time to move the vehicle to a vehicle inspection site and perform inspection in a case where the sensor malfunctions or the like, the vehicle cannot be used during this time, and use efficiency is thus deteriorated.

Therefore, in Embodiment 1, each of the plurality of vehicles 31 to 3m participating in the distributed transaction verification system 100 (an example of the plurality of nearby vehicles) can serve as an inspection target vehicle that receives an inspection simpler than an official inspection such as the above-mentioned vehicle inspection. Specifically, a target of the inspection is, for example, a sensor installed on the vehicle. The inspection target vehicle is one of a total of m vehicles. Remaining (m−1) vehicles are peripheral vehicles that serve to assist the inspection of the target vehicle.

In FIG. 1, first, the inspection target vehicle is selected (St1). FIG. 1 shows an example in which four vehicles CR1, CR2, CR3, and CR4 participate in the distributed transaction verification system 100, and the vehicle CR2 is selected as the target vehicle. The target vehicle (that is, the vehicle CR2), as the transaction related to the inspection, travels on the same travel route in the same area and measures surrounding external environment information during the traveling by a sensor installed on its own vehicle (St1). The target vehicle (that is, the vehicle CR2) transmits result information of the external environment measurement of its own vehicle to the peripheral vehicles on front and rear sides (that is, the vehicles CR1, CR3, and CR4), and inquires whether the external environment measurement result information is correct. For example, the target vehicle (that is, vehicle CR2) inquires a question such as "Do you coincides with my recognition?" The vehicles CR1 to CR4 can communicate with each other by, for example, vehicle-to-vehicle (V2V).

In response to the inquiry from the target vehicle (that is, the vehicle CR2), each peripheral vehicle (that is, the vehicles CR1, CR3 and CR4), as the transaction related to the inspection, travels on the same travel route in the same area as the target vehicle (that is, the vehicle CR2) and measures surrounding external environment information during the traveling by a sensor installed on its own vehicle (St2). Each of the peripheral vehicles (that is, the vehicles CR1, CR3, and CR4) may also compare the external environment measurement result information received from the target vehicle (that is, the vehicle CR2) with external environment measurement result information obtained based on measurement of its own vehicle, and respond with the result. For example, the peripheral vehicles (that is, the vehicles CR1 and CR4) respond with "measured, match". On the other hand, another peripheral vehicle (that is, the vehicle CR3) responds with "measured, wrong".

Each of the peripheral vehicles (that is, the vehicles CR1, CR3, and CR4) reports a result of the comparison of its own vehicle to the server 1 (see FIG. 2) (St3). The server 1 receives the report of the comparison result from each of the peripheral vehicles (that is, the vehicles CR1, CR3, and CR4), and recognizes that the external environment measurement result information of the target vehicle (that is, the vehicle CR2) is correct based on consent of a majority (that is, a majority of (m−1)). The server 1 registers information indicating that the inspection of the target vehicle (that is, the vehicle CR2) is normal on blockchains BKC1 and BKC2 (St3). Moreover, the server 1 transmits a notification (that is, an inspection verification notification) to the target vehicle (that is, the vehicle CR2) to verify that the inspection of the target vehicle (that is, the vehicle CR2) is normal. As a result, the target vehicle (that is, the vehicle CR2) can easily verify that the inspection of its own vehicle is normal by the server 1, and it is possible to continue using of the sensor which serves as the target of the inspection.

A predetermined reward is granted from the server 1 to the peripheral vehicles (that is, the vehicles CR1 and CR4) whose obtained external environment measurement result information coincides with the external environment measurement result information of the target vehicle (that is, the vehicle CR2) among the peripheral vehicles (that is, the vehicles CR1, CR3 and CR4) (St4). For example, transaction information related to the inspection of the peripheral vehicles (that is, the vehicles CR1, CR3, and CR4) is also registered by the server 1 in the blockchains BKC1 and BKC2 (St4). For example, the peripheral vehicle (that is, the vehicle CR3) whose obtained external environment measurement result information cannot coincide with the external environment measurement result information of the target vehicle (that is, the vehicle CR2) is selected by the server 1 as a target vehicle of a next inspection (St4). When the inspection target vehicle is selected, processes of steps St2, St3, and St4 shown in FIG. 1 are repeated.

Next, a configuration of the distributed transaction verification system 100 will be described with reference to FIG. 2. The distributed transaction verification system 100 according to Embodiment 1 includes the server 1, terminals 21, . . . , 2n (n: an integer of 2 or more), and the vehicles 31, . . . , 3m (m: the integer of 3 or more). In other words, them vehicles 31 to 3m participate in the distributed transaction verification system 100 which includes the server 1 or the terminals 21 to 2n that manage the blockchains BKC1 and BKC2.

The server 1, the terminals 21 to 2n, and the vehicles 31 to 3m are communicably connected to each other via a network NW1. The network NW1 is formed as a wireless network such as a wireless local area network (LAN) or a wired network such as a wired LAN.

The server 1 is configured by using an information processing device such as a desktop personal computer (PC), a notebook PC, a smartphone or a tablet terminal having high-speed information processing capability, for example. An internal configuration of the server 1 is the same as that of each of the terminals 21 to 2n (See FIG. 3). The server 1 can hold a part or all of data of the blockchains BKC1 and BKC2 (see FIGS. 5 and 6) in which transaction information (see FIG. 7) related to an inspection of each of the plurality of vehicles 31 to 3m is recorded (registered) in a chain manner, and can newly create and add blocks (see FIG. 7) to the blockchains BKC1 and BKC2. The server 1 comprehensively controls, in cooperation with each of the terminals 21 to 2n, execution of the transaction related to the inspection performed by each of the plurality of vehicles 31 to 3m. Details of the internal configuration of the server 1 will be described later below with reference to FIG. 3.

Each of the terminals 21 to 2n is configured by using an information processing device such as a desktop PC, a notebook PC, a smartphone or a tablet terminal having high-speed information processing capability, for example. An internal configuration of each of the terminals 21 to 2n is the same as that of the server 1 (see FIG. 3). Each of the terminals 21 to 2n can hold a part or all of the data of the blockchains BKC1 and BKC2 (see FIGS. 5 and 6) in which the transaction information (see FIG. 7) related to the inspection of each of the plurality of vehicles 31 to 3m is recorded (registered) in the chain manner, and can newly create and add blocks (see FIG. 7) to the blockchains BKC1 and BKC2. Each of the terminals 21 to 2n supplementarily controls, in cooperation with the server 1, the execution of the transaction related to the inspection performed by each of the plurality of vehicles 31 to 3m. Details of the internal configuration of the terminals 21 to 2n will be described later below with reference to FIG. 3.

Each of the vehicles 31 to 3m is a vehicle capable of self-driving, and is equipped with at least one sensor (see FIG. 4) capable of measuring the external environment information around the vehicle so as to perform the self-driving. Details will be described with reference to FIG. 4. Each of the vehicles 31 to 3m is equipped with, as sensors, a camera 41, a LiDAR 42, a millimeter wave radar 43, and another sensor group 44, and uses such sensors to perform the self-driving. As described above, each of the vehicles 31 to 3m can serve as a target vehicle of a sensor inspection, or as a peripheral vehicle that assists the inspection of the target vehicle. Each of the vehicles 31 to 3m executes the transaction related to the inspection (see above) based on an execution instruction (described later below) from the server 1 or a vehicle serving as the target vehicle, and reports an execution result (that is, the external environment measurement result information). Details of internal configurations of the vehicles 31 to 3m will be described later below with reference to FIG. 4.

Although data entities of the blockchains BKC1 and BKC2 are recorded and stored in the server 1 and the terminals 21 to 2n, for example, since the server 1 and the terminals 21 to 2n are connected to the network NW1, it can be considered that the data entities are virtually recorded and held in the network NW1 as viewed from the vehicles 31 to 3m.

Figure 3:
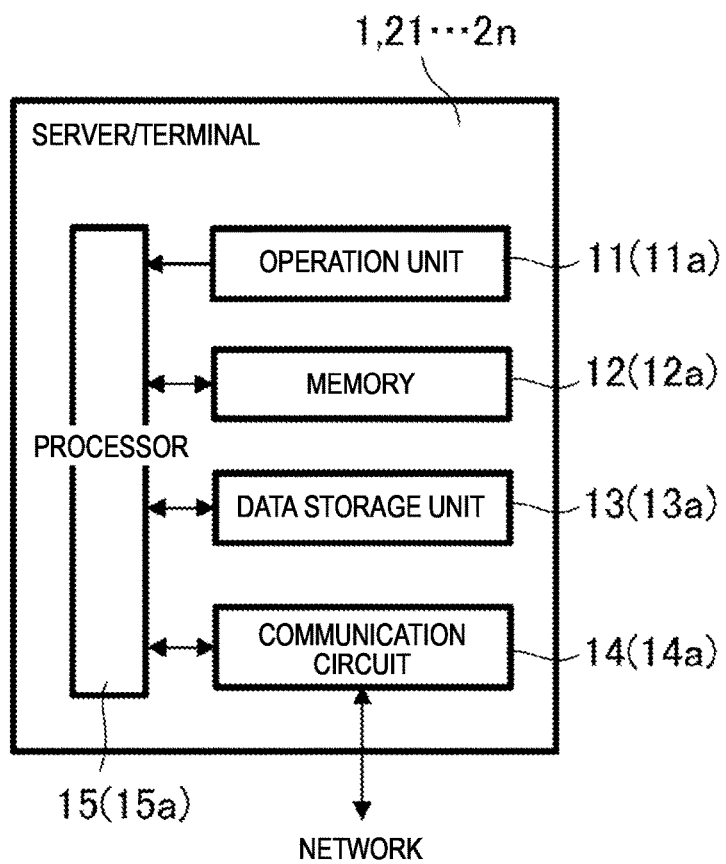
FIG. 3 is a block diagram showing an internal configuration example of a server and a terminal.

FIG. 3 is a block diagram showing an internal configuration example of the server 1 and the terminals 21 to 2n. The server 1 includes an operation unit 11, a memory 12, a data storage unit 13, a communication circuit 14, and a processor 15.

The operation unit 11 is configured by an input device that receives an operation of a user of the distributed transaction verification system 100 (for example, an operator or administrator of the distributed transaction verification system 100, the same also applies hereinafter). The operation unit 11 is configured by, for example, a mouse, a keyboard, or a touch panel. It should be noted that the configuration of the operation unit 11 used by the user may also be omitted from the server 1 by using a function according to a smart contract function in blockchain technology. That is, in order to use the function according to the smart contract function, the processor 15 records and holds pre-defined information in the memory 12 or the data storage unit 13 so as to execute predetermined processing. When the processor 15 detects occurrence of an event described by the above pre-defined information, the processor 15 may automatically execute the predetermined processing. The predetermined processing is, for example, creation and transmission of the inspection verification notification to be described later below, and is not limited thereto.

The memory 12 is configured by using, for example, a random access memory (RAM) and a read-only memory (ROM). The memory 12 temporarily holds programs and data necessary for execution of an operation of the server 1, and data or information generated during the operation. The RAM is, for example, a work memory used during the operation of the server 1. The ROM stores, in advance, programs and data used for controlling the server 1, for example.

The data storage unit 13 is configured by using, for example, a hard disk drive (HDD) or a solid state drive (SSD). The data storage unit 13 records and holds data or information generated by the processor 15. The data storage unit 13 records and holds part of all of the data of the blockchains BKC1 and BKC2, for example. Details of an example of a data structure of the blockchains BKC1 and BKC2 will be described later below with reference to FIGS. 5 and 6.

The communication circuit 14 is configured by a communication circuit capable of transmitting and receiving data or information to and from each of the terminals 21 to 2n or each of the vehicles 31 to 3m. Upon receiving data or information generated by the processor 15, the communication circuit 14 transmits the data or information to a communication partner (for example, each of the terminals 21 to 2n or each of the vehicles 31 to 3m). The communication circuit 14 also receives data or information transmitted from the communication partner (see above) and transmits the received data or information to the processor 15.

The processor 15 is configured by using, for example, a central processing unit (CPU), a digital signal processor (DSP), or a field programmable gate array (FPGA). The processor 15 functions as a controller that controls an overall operation of the server 1, and executes a control process of totally controlling operations of each unit of the server 1, a data input and output process with respect to each unit of the server 1, a data operation (calculation) process, and a data storage process. The processor 15 is operated in accordance with the programs and data stored in the memory 12. The processor 15 uses the memory 12 during an operation and temporarily stores data or information generated or acquired by the processor 15 in the memory 12, or records the data or information in the data storage unit 13. An operation example of the processor 15 will be described in detail later below with reference to FIG. 8.

The terminals 21 to 2n include an operation unit 11a, a memory 12a, a data storage unit 13a, a communication circuit 14a, and a processor 15a.

The operation unit 11a is configured by an input device that receives the operation of the user of the distributed transaction verification system 100. The operation unit 11a is configured by, for example, a mouse, a keyboard, or a touch panel. It should be noted that the configuration of the operation unit 11a used by the user may also be omitted from the terminals 21 to 2n by using the function according to the smart contract function in the blockchain technology. That is, in order to use the function according to the smart contract function, the processor 15a records and holds pre-defined information in the memory 12a or the data storage unit 13a so as to execute predetermined processing. When the processor 15a detects occurrence of an event described by the above pre-defined information, the processor 15 may automatically execute the predetermined processing. The predetermined processing is, for example, the creation and transmission of the inspection verification notification to be described later below, and is not limited thereto.

The memory 12a is configured by using, for example, a RAM and a ROM. The memory 12a temporarily holds programs and data necessary for execution of an operation of each of the terminals 21 to 2n, and data or information generated during the operation. The RAM is, for example, a work memory used during the operation of each of the terminals 21 to 2n. The ROM stores, in advance, programs and data used for controlling each of the terminals 21 to 2n, for example.

The data storage unit 13a is configured by using, for example, an HDD or an SSD. The data storage unit 13a records and holds data or information generated by the processor 15a. The data storage unit 13a records and holds part or all of the data of the blockchains BKC1 and BKC2, for example.

The communication circuit 14a is configured by a communication circuit capable of transmitting and receiving data or information to and from the server 1 or each of the vehicles 31 to 3m. Upon receiving data or information generated by the processor 15a, the communication circuit 14a transmits the data or information to a communication partner (for example, the server 1 or each of the vehicles 31 to 3m). The communication circuit 14a also receives data or information transmitted from the communication partner (see above) and transmits the received data or information to the processor 15a.

The processor 15a is configured by using, for example, a central processing unit (CPU), a digital signal processor (DSP), or a field programmable gate array (FPGA). The processor 15a functions as a controller that controls an overall operation of each of the terminals 21 to 2n, and executes a control process of totally controlling operations of each unit of each of the terminals 21 to 2n, a data input and output process with respect to each unit of each of the terminals 21 to 2n, a data operation (calculation) process, and a data storage process. The processor 15a is operated in accordance with the programs and data stored in the memory 12a. The processor 15a uses the memory 12a during an operation and temporarily stores data or information generated or acquired by the processor 15a in the memory 12a, or records the data or information in the data storage unit 13a. An operation example of the processor 15a will be described in detail later below with reference to FIG. 11.

Figure 4:
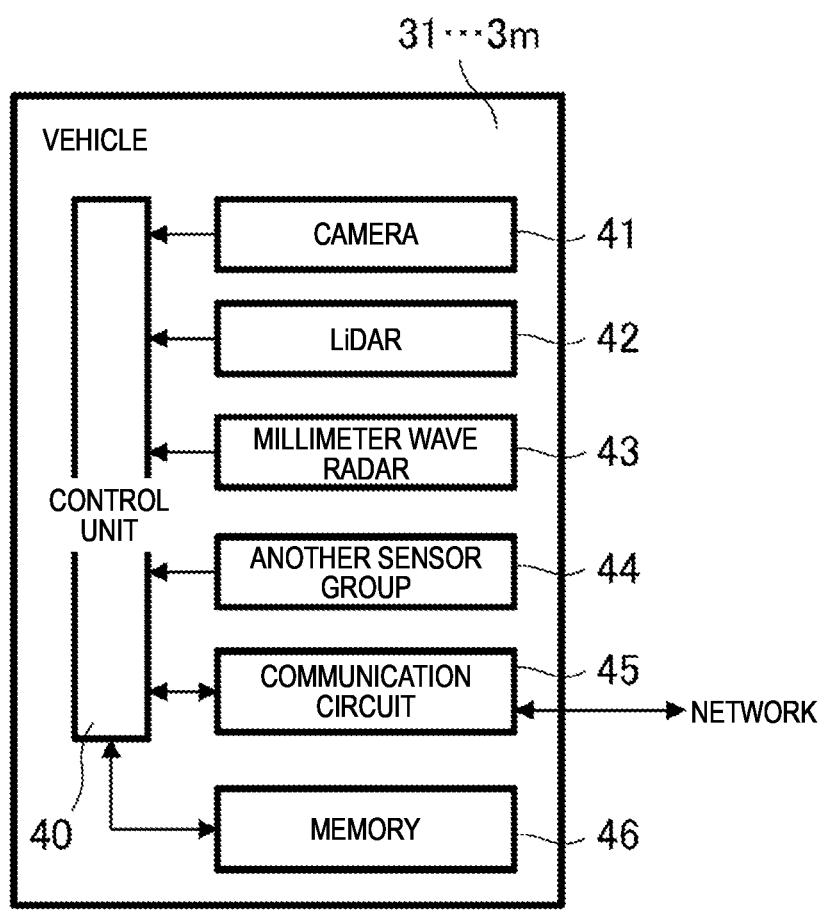
FIG. 4 is a block diagram showing an internal configuration example of a vehicle.

FIG. 4 is a block diagram showing an internal configuration example of the vehicles 31 to 3m. Each of the vehicles 31 to 3m includes a control unit 40, a camera 41, a LiDAR 42, a millimeter wave radar 43, another sensor group 44, a communication circuit 45, and a memory 46. In the distributed transaction verification system 100 according to Embodiment 1, the camera 41, the LiDAR 42, the millimeter wave radar 43, and the other sensor group 44 are sensors serving as targets of an inspection execution request which is transmitted from the server 1 so as to perform an inspection easily whenever necessary instead of inspecting each of the vehicles 31 to 3m every 3 or 2 years like the vehicle inspection.

Each of the vehicles 31 to 3m is, for example, a vehicle having a self-driving level of 1 or higher, and a vehicle having a self-driving level of 3 will be described below as an example. The camera 41, the LiDAR 42, the millimeter wave radar 43, the other sensor group 44, the communication circuit 45, and the control unit 40 are connected to each other via an in-vehicle network such as a controller area network (CAN) so as to be capable of inputting and outputting data or information to and from each other.

Each of the vehicles 31 to 3m is equipped with the controller 40 as an example of a controller configured to control self-driving. The control unit 40 is configured by using, for example, a processor such as an electronic control unit (ECU). The control unit 40 may be configured by using a single or a plurality of the ECUs. The control unit 40 is operated in accordance with programs and data stored in the memory 46. Specifically, the control unit 40 generates route information during the self-driving based on a detection output of various sensors (specifically, the camera 41, the LiDAR 42, the millimeter wave radar 43, and the other sensor group 44).

The control unit 40 performs the self-driving while controlling control target equipment (to be described later below) in accordance with the generated route information. The self-driving of each of the vehicles 31 to 3m includes a function of activating a brake to stop each of the vehicles 31 to 3m immediately before collision with an obstacle (for example, a hole in a road, another vehicle, a two-wheeled vehicle such as a motorcycle, a pedestrian, a guardrail, a utility pole, a pole, or a facility such as a store) The self-driving of each of the vehicles 31 to 3m includes a function of following another vehicle running ahead while maintaining a certain distance thereto. The self-driving of each of the vehicles 31 to 3m includes a function of controlling steering of each of the vehicles 31 to 3m such that each of the vehicles 31 to 3m does not go out of a lane. Each of the above functions is an example of the self-driving, and the self-driving is not limited to such functions.

The camera 41, which is an example of the sensor, is a so-called in-vehicle camera, and includes an image capturing element such as a charge coupled device (CCD) or a complementary metal oxide semiconductor (CMOS). The camera 41 is provided, for example, at a center of a vehicle body front portion of each of the vehicles 31 to 3m, and captures an image of a front center range which serves as a detection range. For example, the camera 41 detects the obstacle (see above) or a traffic light in front of the own vehicle. The camera 41 can use data of the captured image to execute image processing, and can detect information indicating a relationship between the obstacle detected by the image processing and the own vehicle (for example, information on speed or position of the obstacle based on the own vehicle), or can detect a position and a size of the traffic light, and a color of a signal light. The camera 41 transmits the captured image or a result of the image processing executed on the captured image to the control unit 40.

The LiDAR 42, which serves as another example of the sensor, emits a light beam (for example, an infrared laser) around each of vehicles 31 to 3m, receives a reflected signal thereof, and measures, based on the received reflected signal, a distance to a surrounding object (for example, the above-mentioned obstacle), a size of the object, and composition of the object. The LiDAR 42 transmits a result of the measurement to the control unit 40.

The millimeter wave radar 43, which serve as another example of the sensor, radiates a radio wave (for example, a millimeter wave) around each of the vehicles 31 to 3m, receives a reflected signal thereof, and measures, based on the received reflected signal, a distance to a surrounding object. The millimeter wave radar 43 transmits a result of the measurement to the control unit 40. The millimeter wave radar 43 can detect a more distant object which is difficult to be detected by the LiDAR 42.

The other sensor group 44 is a plurality of sensors installed in addition to the camera 41, the LiDAR 42, and the millimeter wave radar 43 described above. For example, an around view camera, a GNSS sensor, and a laser range finder are applicable.

The around view camera, which serves as another example of the sensor, is configured by using a plurality of cameras installed in front of, behind and beside a vehicle body of each of the vehicles 31 to 3m (for example, six cameras, two in front of the vehicle body, two behind the vehicle body, and two beside the vehicle body). The around view camera detects a white line in the vicinity of each of the vehicles 31 to 3m, another vehicle in an adjacent lane, and the like.

The GNSS sensor, which serves as another example of the sensor, receives a plurality of signals indicating time of transmission from a plurality of GPS satellites and positions (coordinates) of the GPS satellites, and calculates, based on the received plurality of signals, a position of a GPS receiver (that is, a position of each of the vehicles 31 to 3m). The GNSS sensor transmits position information of each of the vehicles 31 to 3m (result of the calculation) to the control unit 40.

The laser range finder, which serves as another example of the sensor, is respectively installed on a vehicle body front right side, a vehicle body front left side, a vehicle body right side, a vehicle body left side, a vehicle body rear right side, and a vehicle body rear left side of each of the vehicles 31 to 3m. The laser range finders detect the obstacles (see above) and the like existing on the front right side, the front left side, the right side, the left side, the rear right side, and the rear left side of each of the vehicles 31 to 3m. Specifically, each laser range finder irradiates laser beams to perform scanning over a certain wide-angle angle range, receives reflected light thereof and detects a time lag between a start time of the irradiation and a time when the reflected light is received so as to detect a distance between the own vehicle and the obstacle, and a direction of the obstacle as viewed from the vehicle.

The other sensor group 44 is not limited to the above-described around view camera, GNSS sensor, and laser range finder, and may also include, for example, a gyro sensor, an acceleration sensor, a geomagnetic sensor, an inclination sensor, a temperature sensor, a barometric pressure sensor, a humidity sensor, and an illuminance sensor. Further, each of the vehicles 31 to 3m does not need to include all of the above-mentioned various sensors, and the sensors may be appropriately provided according to a self-driving level assigned to each of the vehicles 31 to 3m.

The communication circuit 45 is configured by a communication circuit capable of transmitting and receiving data or information to and from the server 1 or each of the terminals 21 to 2n. The communication circuit 45 transmits data or information generated or acquired by the control unit 40 to the server 1 or each of the terminals 21 to 2n. The communication circuit 45 receives data or information transmitted from the server 1 or each of the terminals 21 to 2n and transmits the received data or information to the control unit 40.

The memory 46 is configured by using, for example, a RAM and a ROM, and temporarily stores programs or data necessary for execution of an operation of the control unit 40, and data or information generated during the operation. The RAM is, for example, a work memory used during the operation of the control unit 40. The ROM stores, in advance, programs and data used for controlling the control unit 40, for example.

The control unit 40 also calculates a control value used for controlling the control target equipment necessary for the self-driving, such as an accelerator throttle opening degree of each of the vehicles 31 to 3m, a braking force of each of the vehicles 31 to 3m, a steering angle, and blinking timing of a winker. The control value is calculated, for example, in such a manner that enables traveling in accordance with the route information generated by the control unit 40. The control unit 40 transmits the calculated control value to an actuator (that is, a steering actuator, an accelerator pedal actuator, a brake actuator, or a winker blinking controller) configured to driving each piece of the control target equipment (for example, a steering, an accelerator pedal, a brake, or a direction indicator).

The control target equipment is equipment provided in each of the vehicles 31 to 3m, and receives operation control provided by the control unit 40 during the self-driving of each of the vehicles 31 to 3m. The control target equipment is, for example, the steering actuator, the accelerator pedal actuator, the brake actuator, or the winker blinking controller, and is not limited thereto.

The steering actuator is connected to a steering provided in each of the vehicles 31 to 3m, and controls an operation of a steering during the self-driving (in other words, maintaining or changing a traveling direction of each of the vehicles 31 to 3m) in accordance with a control signal of the steering (not shown) input from the control unit 40.

The accelerator pedal actuator is connected to an accelerator pedal provided in each of the vehicles 31 to 3m, and controls an operation of the accelerator pedal during the self-driving (in other words, maintaining, increasing or decreasing a vehicle speed of each of the vehicles 31 to 3m) in accordance with a control signal of the accelerator pedal (not shown) input from the control unit 40.

The brake actuator is connected to a brake provided in each of the vehicles 31 to 3m, and controls an operation of the brake during the self-driving (in other words, maintaining or changing braking for traveling of each of the vehicles 31 to 3m) in accordance with a control signal of the brake (not shown) input from the control unit 40.

The winker blinking controller is connected to a winker blinking mechanism provided in each of the vehicles 31 to 3m, and controls an operation of a direction indicator during the self-driving (in other words, blinking of the direction indicator for notifying a left turn or a right turn of each of the vehicles 31 to 3m) in accordance with a control signal of the winker blinking mechanism (not shown) input from the control unit 40.

Figure 5:
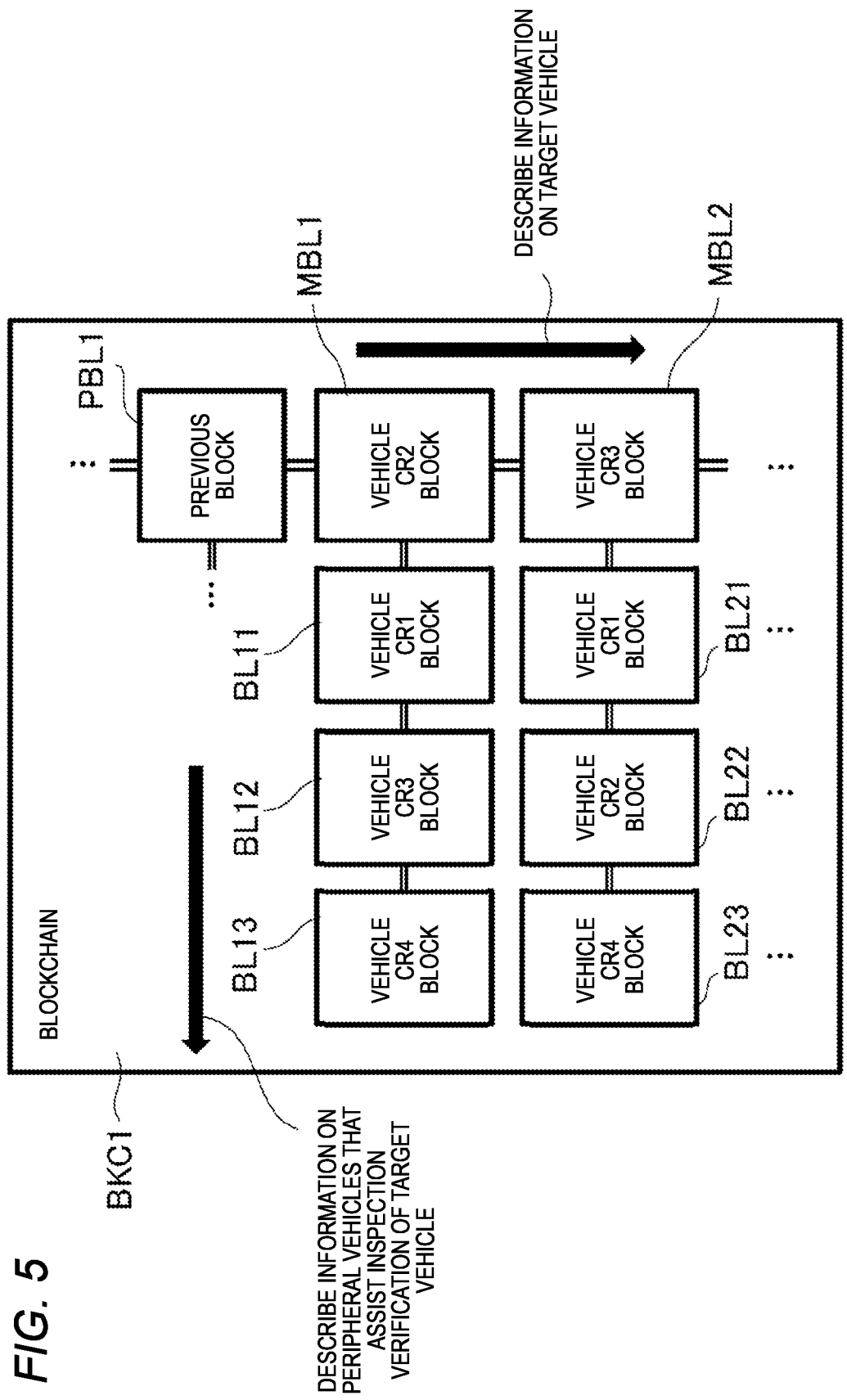
FIG. 5 shows a first configuration example of a blockchain.
Figure 6:
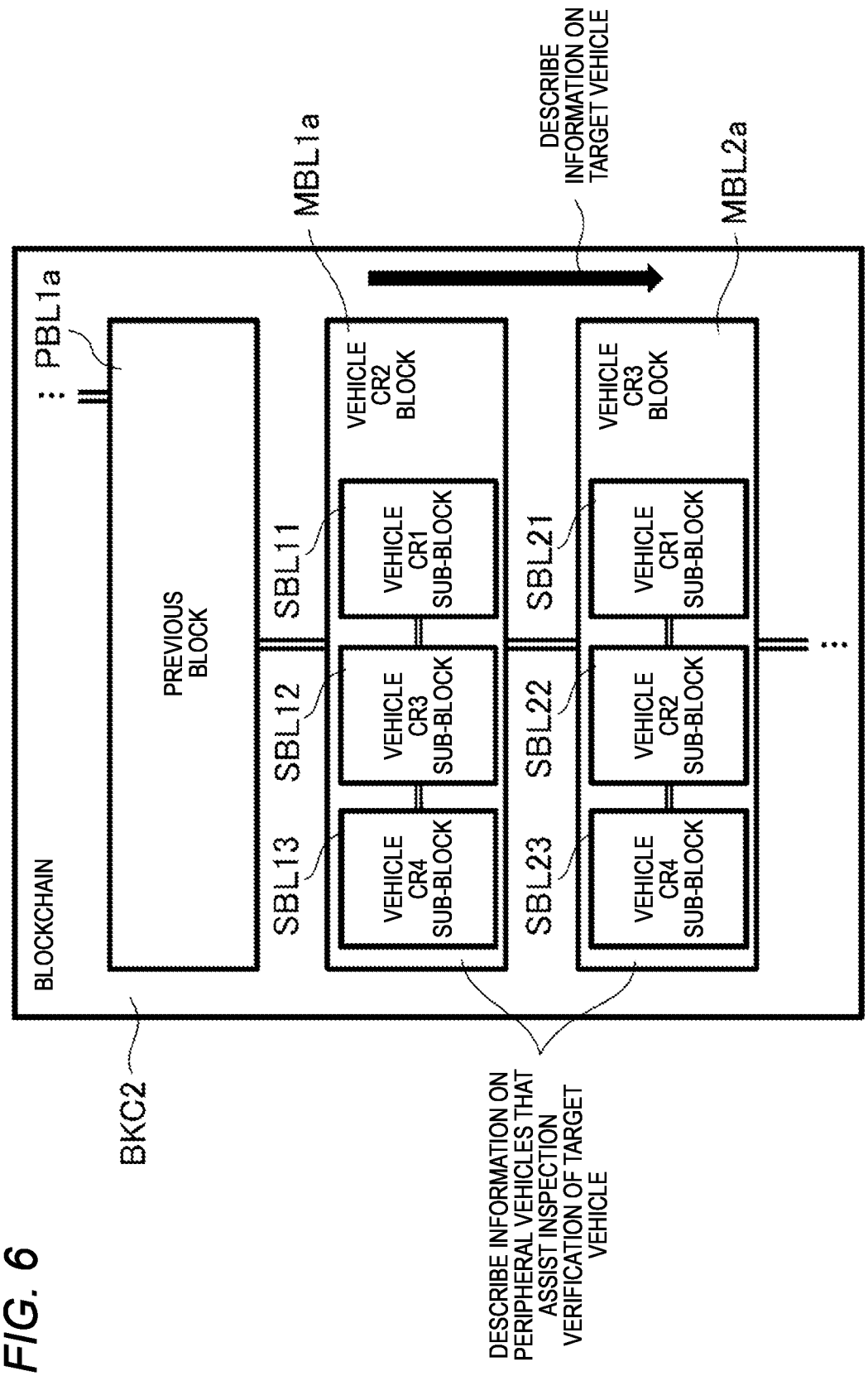
FIG. 6 shows a second configuration example of the blockchain.

Next, a structural example of the blockchains BKC1 and BKC2 created and recorded by the server 1 and each of the terminals 21 to 2n will be described with reference to FIGS. 5 and 6. FIG. 5 shows a first configuration example of the blockchains. FIG. 6 shows a second configuration example of the blockchains. The blockchains BKC1 and BKC2 in FIGS. 5 and 6 have data structures corresponding to the first use case shown in FIG. 1. The blockchains BKC1 and BKC2 are not limited to the data structure examples shown in FIGS. 5 and 6.

The blockchain BKC1 shown in FIG. 5 records transaction information related to the inspection of each of the plurality of vehicles CR1 to CR4 in a chain manner (like a string of beads) such that there is a time-series relationship between each piece of the transaction information. Specifically, the blockchain BKC1 has a configuration in which blocks created each time when the transaction related to the inspection is executed by each of the plurality of vehicles CR1 to CR4 are linked in a time-series like a chain.

Specifically, in the blockchain BKC1 shown in FIG. 5, a block MBL1 of the vehicle CR2, which is created after a previous block PBL1, is created and connected to the previous block PBL1, which is created previously, in a vertical direction (that is, linked thereto). More specifically, a hash value (so-called digest), which is an output of a one-way function (so-called hash function) of the previous block PBL1 created previously, is held in the block MBL1 of the vehicle CR2 (see FIG. 7). The vertical direction here referred to a time series direction in which blocks corresponding to vehicles selected as target vehicles of inspection verification are connected in the distributed transaction verification system 100.

As described with reference to FIG. 1, the block MBL1 of the vehicle CR2 is a block including the transaction information corresponding to the transaction related to the inspection performed by the vehicle CR2 which is selected as the target vehicle of the inspection verification in the distributed transaction verification system 100 (that is, the target vehicle of the sensor inspection). In the block MBL1 of the vehicle CR2, side blocks BL11, BL12, and BL13, which include transaction information corresponding to transactions related to inspections performed by the peripheral vehicles other than the inspection target vehicle (that is, the vehicles CR1, CR3, and CR4 that assist the inspection verification of the vehicle CR2), are connected in association with each other in a horizontal direction (that is, linked with each other). The side blocks BL11, BL12, and BL13 correspond to a block of the vehicle CR1, a block of the vehicle CR3, and a block of the vehicle CR4, respectively. The horizontal direction here referred to a direction in which the blocks corresponding to the vehicles selected as the peripheral vehicles assisting the inspection verification of the target vehicle are connected in the distributed transaction verification system 100.

A block MBL2 of the vehicle CR3, which is created after the block MBL1 of the vehicle CR2, is created and connected to the block MBL1 of the vehicle CR2 in the vertical direction (that is, linked thereto). More specifically, a hash value (so-called digest), which is an output of a one-way function (so-called hash function) of the block MBL1 of the vehicle CR2 created previously, is held in the block MBL2 of the vehicle CR3 (see FIG. 7).

As described with reference to FIG. 1, the block MBL2 of the vehicle CR3 is a block including the transaction information corresponding to the transaction related to the inspection performed by the vehicle CR3 which is selected as the target vehicle of the inspection verification in the distributed transaction verification system 100 (that is, the target vehicle of the sensor inspection). In the block MBL2 of the vehicle CR3, side blocks BL21, BL22, and BL23, which includes transaction information corresponding to transactions related to inspections performed by the peripheral vehicles other than the inspection target vehicle (that is, the vehicles CR1, CR2, and CR4 that assist the inspection verification of the vehicle CR3), are connected in association with each other in the horizontal direction (that is, linked with each other).

In the same way as the blockchain BKC1 shown in FIG. 5, the blockchain BKC2 shown in FIG. 6 records the transaction information related to the inspection of each of the plurality of vehicles CR1 to CR4 in the chain manner (like a string of beads) such that there is a time-series relationship between each piece of the transaction information. Specifically, the blockchain BKC2 has a configuration in which blocks created each time when the transaction related to the inspection is executed by each of the plurality of vehicles CR1 to CR4 are linked in a time-series like a chain.

Specifically, in the blockchain BKC2 shown in FIG. 6, a block MBL1a of the vehicle CR2, which is created after a previous block PBL1a, is created and connected to the previous block PBL1a, which is created previously, in the vertical direction (that is, linked thereto). More specifically, a hash value (so-called digest), which is an output of a one-way function (so-called hash function) of the previous block PBL1 created previously, is held in the block MBL1 of the vehicle CR2 (see FIG. 7). Similarly to FIG. 5, the block MBL1a of the vehicle CR2 is a block corresponding to the vehicle CR2 which is selected as the inspection target vehicle among the plurality of vehicles CR1 to CR4. Unlike the block MBL1 of the vehicle CR2 shown in FIG. 5, in the block MBL1a of the vehicle CR2, side blocks SBL11, SBL12, and SBL13, which include the transaction information corresponding to the transactions related to the inspections performed by the peripheral vehicles other than the inspection target vehicle (that is, the vehicles CR1, CR3, and CR4 that assist the inspection verification of the vehicle CR2), are held in an inclusive manner.

A block MBL2a of the vehicle CR3, which is created after the block MBL1a of the vehicle CR2, is created and connected to the block MBL1 a of the vehicle CR2 in the vertical direction (that is, linked thereto). More specifically, a hash value (so-called digest), which is an output of a one-way function (so-called hash function) of the block MBL1a of the vehicle CR2 created previously, is held in the block MBL2a of the vehicle CR3 (see FIG. 7). Similarly to FIG. 5, the block MBL2a of the vehicle CR3 is a block corresponding to the vehicle CR3 which is selected as the inspection target vehicle among the plurality of vehicles CR1 to CR4. In the block MBL2a of the vehicle CR3, side blocks SBL21, SBL22, and SBL23, which include the transaction information corresponding to the transactions related to the inspections performed by the peripheral vehicles other than the inspection target vehicle (that is, the vehicles CR1, CR2, and CR4 that assist the inspection verification of the vehicle CR3), are held in an inclusive manner.

Figure 7:
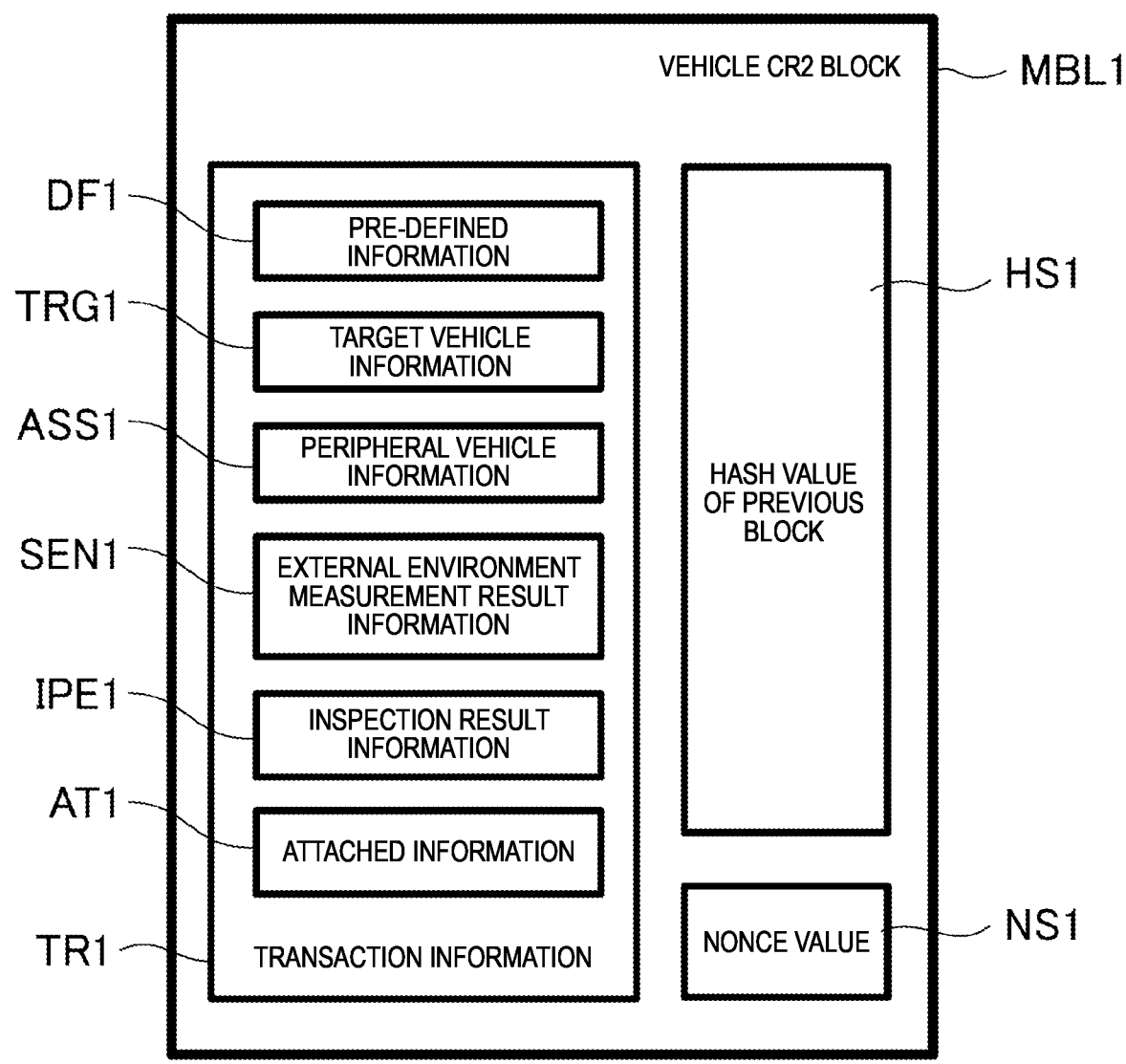
FIG. 7 is an example of a data structure of blocks that constitute the blockchain.

FIG. 7 is an example of a data structure of the blocks that constitute the blockchains. For example, although the block MBL1 of the vehicle CR2 (see FIG. 5) is exemplified and described in FIG. 7, data structure examples in individual blocks are the same. The block MBL1 of the vehicle CR2 includes a hash value HS1 of the previous block, a nonce value NS1, and at least one piece of transaction information TR1.

As described above, the hash value HS1 of the previous block indicates the time series relationship that the block MBL1 of the vehicle CR2 is created after the block created previously (for example, the previous block PBL1 shown in FIG. 5). In other words, the hash value HS1 indicates which block is created immediately before the present block.

The nonce value NS1 is adjustment data to be written by any one of the server 1 or the terminals 21 to 2n such that the hash value HS1 is adjusted to a number smaller than a predetermined value (so-called difficulty target) when any one of the server 1 or the terminals 21 to 2n creates a new block.

The transaction information TR1 includes pre-defined information DF1, target vehicle information TRG1, peripheral vehicle information ASS1, external environment measurement result information SEN1, inspection result information IPE1, and attached information AT1.

The pre-defined information DF1 includes information of a sensor to be inspected among sensors included in the target vehicle, the number of peripheral vehicles other than the target vehicle, execution contents of the transaction related to the inspection, a comparison instruction of execution results of the transactions related to the inspections performed by the target vehicle and the peripheral vehicles, and the like. The pre-defined information DF1 is described by the server 1 or each of the terminals 21 to 2n.

The target vehicle information TRG1 indicates information related to the inspection target vehicle selected by the server 1 among the plurality of vehicles 31 to 3m (including identification information). The target vehicle information TRG1 is described by the server 1 or each of the terminals 21 to 2n.

The peripheral vehicle information ASS1 indicates information related to the peripheral vehicles other than the inspection target vehicle selected by the server 1 among the plurality of vehicles 31 to 3m (including identification information). The peripheral vehicle information ASS1 is described by the server 1 or each of the terminals 21 to 2n.

The external environment measurement result information SEN1 indicates data or information measured by a sensor included in the vehicle as an execution result of the transaction related to the inspection of the vehicle corresponding to the own block (the vehicle CR2 selected as the inspection target vehicle in the example of FIG. 7). For example, the external environment measurement result information SEN1 corresponds to topographical information, sign recognition result information, and traffic light color identification result information on the same travel route in the same area where the target vehicle and the peripheral vehicles travel. However, the external environment measurement result information SEN1 is not limited to the topographical information, the sign recognition result information, and the traffic light color identification result information. The external environment measurement result information SEN1 is described by the server 1 or each of the terminals 21 to 2n that receive the external environment measurement result information transmitted from the vehicle corresponding to the own block.

The inspection result information IPE1 indicates an inspection result indicating presence or absence of any malfunction (for example, a failure) of the sensor included in the target vehicle, which is determined based on a comparison between the execution results of the transactions related to the inspection of the target vehicle and the peripheral vehicles. The inspection result information IPE1 is described by the server 1 or each of the terminals 21 to 2n that determine the presence or absence of the malfunction (for example, the failure) of the sensor included in the target vehicle.

The attached information AT1 includes, for example, date and time information of the execution of the transaction related to the inspection, area information, travel route information, and other block information having a relationship with the own block. The attached information AT1 may also include information related to side blocks (including identification information) when the own block is held in such a manner that the side blocks are included.

Figure 8:
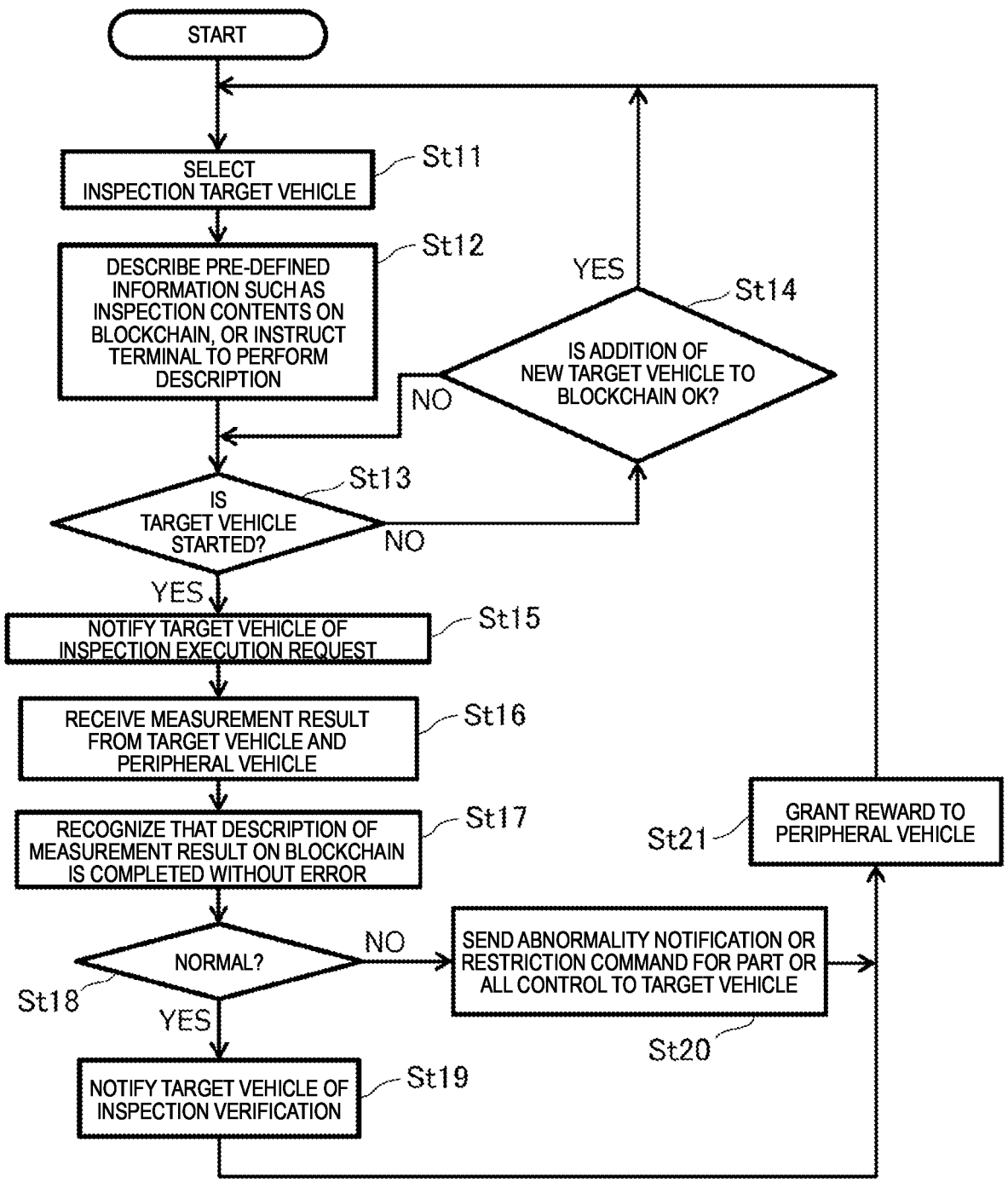
FIG. 8 is a flowchart showing an example of an operation procedure of the server corresponding to the first use case in time series.

Next, operation procedures of the server 1, the target vehicle, the peripheral vehicles, and the terminals 21 to 2n of the distributed transaction verification system 100 according to the first use case will be described with reference to FIGS. 8, 9, 10, 11, 12, and 13, respectively. FIG. 8 is a flowchart showing an example of the operation procedure of the server 1 corresponding to the first use case in time series. Each process shown in FIG. 8 is executed by the processor 15 of the server 1.

In FIG. 8, the server 1 selects the target vehicle of the sensor inspection from the plurality of vehicles 31 to 3m participating in the distributed transaction verification system 100 (St11). After step St11, the server 1 newly creates blocks corresponding to the target vehicle and the peripheral vehicles (see FIG. 5) or the target vehicle (see FIG. 6) and adds (registers) the blocks to the blockchains BKC1 and BKC2. The server 1 describes the pre-defined information DF1 which includes inspection contents, the target vehicle information TRG1, and the peripheral vehicle information ASS1 in the blocks added to the blockchains BKC1 and BKC2, or selects one of the terminals 21 to 2n so as to instruct the description of the pre-defined information DF1, the target vehicle information TRG1, and the peripheral vehicle information ASS1 (St12).

The server 1 directly inquires of the target vehicle, via the network NW1, whether the target vehicle selected in step St11 is started (for example, whether an ignition thereof is turned on), or indirectly inquires of another peripheral vehicle (St13). When the server 1 determines that the target vehicle is not started as a response result of the inquiry (St13, NO), the server 1 determines whether to newly add (register) a block corresponding to a new target vehicle to the blockchains BKC1 and BKC2 (St14).

The server 1 includes tolerance information indicating the number of held unfinished blocks where no inspection result of the target vehicle corresponding to any created block is described (in other words, the inspection verification is not performed). Such tolerance information may also be held, for example, in the memory 12. When the number of held blocks corresponding to the target vehicle determined to have not been started in step St13 coincides with a tolerance corresponding to the tolerance information, the server 1 cannot create any new block on the blockchains BKC1 and BKC2, and thus an operation of the processor 15 is in a standby state until the target vehicle is started (St14, NO).

On the other hand, when the number of held blocks corresponding to the target vehicle determined to have not been started in step St13 is less than the tolerance corresponding to the tolerance information (St14, YES), the server 1 newly creates a block corresponding to the inspection target and adds (registers) the block to the blockchains BKC1 and BKC2. That is, processing of the server 1 returns to step St11. In this case, another vehicle is selected as the target vehicle.

On the other hand, when it is determined that the target vehicle is started (St13, YES), the server 1 creates the inspection execution request which includes the pre-defined information DF1, the target vehicle information TRG1, and the peripheral vehicle information ASS1, and notifies the target vehicle (St15). The inspection execution request indicates an execution instruction of the transaction related to the inspection which is to be executed by the target vehicle specified by the target vehicle information TRG1 and is described by the pre-defined information DF1. As will be described later below with reference to FIGS. 9, 12, and 13, upon receiving a notification of the inspection execution request in step St15, the target vehicle transmits the execution instruction of the transaction related to the inspection to the peripheral vehicles based on the peripheral vehicle information ASS1 (St32).

The server 1 receives the external environment measurement result information as the execution result of the transaction related to the inspection from each of the target vehicle and the peripheral vehicles (St16), and respectively describes the external environment measurement result information in blocks of the corresponding target vehicle or peripheral vehicles on the blockchains BKC1 and BKC2. As will be described later below, the external environment measurement result information may also be described in the blocks by any one of the terminals 21 to 2n that receive the external environment measurement result information instead of the server 1 (see FIG. 11).

The server 1 recognizes that the description of the external environment measurement result information is completed on the blockchains BKC1 and BKC2 without error (St17).

The server 1 determines whether the inspection of the target vehicle is normal based on the external environment measurement result information described in step St17 in the blocks corresponding to the target vehicle and the peripheral vehicles on the blockchains BKC1 and BKC2 (St18). The server 1 describes a determination result of step St18 as the inspection result information IPE1 in the block corresponding to the target vehicle.

When it is determined that the number of the peripheral vehicles obtaining external environment measurement result information that coincides with the external environment measurement result information of the target vehicle is a majority, the server 1 determines that the inspection of the target vehicle is normal (St18, YES). In this case, the server 1 issues (creates) an inspection verification notification as an example of the inspection result information IPE1 and transmits the inspection verification notification to the target vehicle (St19). The inspection verification notification is information that ensures effectiveness of the fact that the inspection of the target vehicle is normal since consent of the majority of the peripheral vehicles participating in the distributed transaction verification system 100 according to Embodiment 1 is obtained. As a result, according to the distributed transaction verification system 100, inspection verification of a sensor included in a vehicle can be simply and easily issued between the target vehicle and the peripheral vehicles. As described above, a change is achieved from a centralized type that issues a certificate of vehicle inspection completion at an existing vehicle inspection site to a decentralized type that allows issue of the inspection verification according to vehicle inspection verification as a service of an individual or a private company, so that it is possible to execute an inspection of vehicle abnormalities in a shorter cycle than before, and to verify that a vehicle (for example, a self-driving vehicle) is normal.

On the other hand, when it is determined that the number of the peripheral vehicles obtaining the external environment measurement result information that coincides with the external environment measurement result information of the target vehicle is a minority (St18, NO), the server 1 determines that the inspection of the target vehicle is abnormal. In this case, the server 1 creates an abnormality notification (that is, an information notification indicating that the inspection of the target vehicle is abnormal) as an example of the inspection result information IPE1 and transmits the abnormality notification to the target vehicle, or creates a command to restrict functions (control) of part or all of the sensors included in the target vehicle (that is, a control restriction command) and transmits the control restriction command to the target vehicle (St20).

When the control restriction command is received from the server 1, the target vehicle restricts use of the sensor specified by the control restriction command. For example, a brake assist function (for example, a function that activates the brake when a red light is detected) of the target vehicle is turned off. As a result, for example, since the use of the sensor specified by the control restriction command is subtracted during the self-driving, probability that the target vehicle will cause a traffic violation or a traffic accident can be reduced.

After step St19 or step St20, the server 1 grants a predetermined reward to part or all of the peripheral vehicles obtaining the external environment measurement result information that coincides the external environment measurement result information of the target vehicle (St21). The predetermined reward is, for example, a specified amount of virtual currency or a specified point value.

Figure 9:
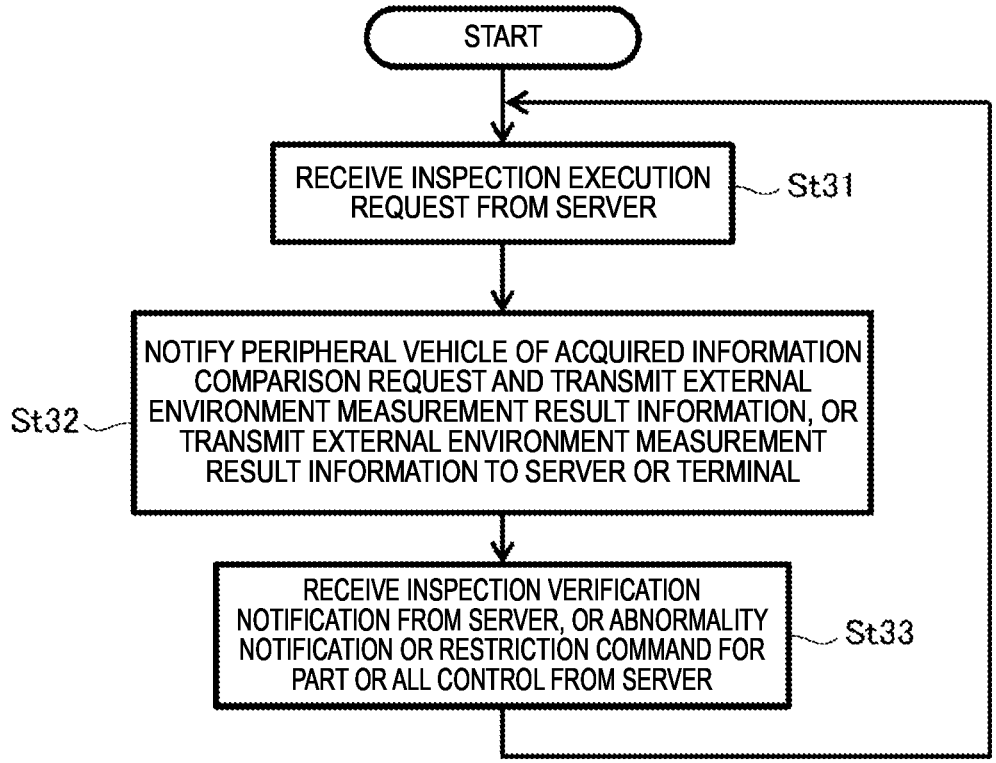
FIG. 9 is a flowchart showing an example of an operation procedure of a target vehicle (vehicle) in time series.
Figure 10:
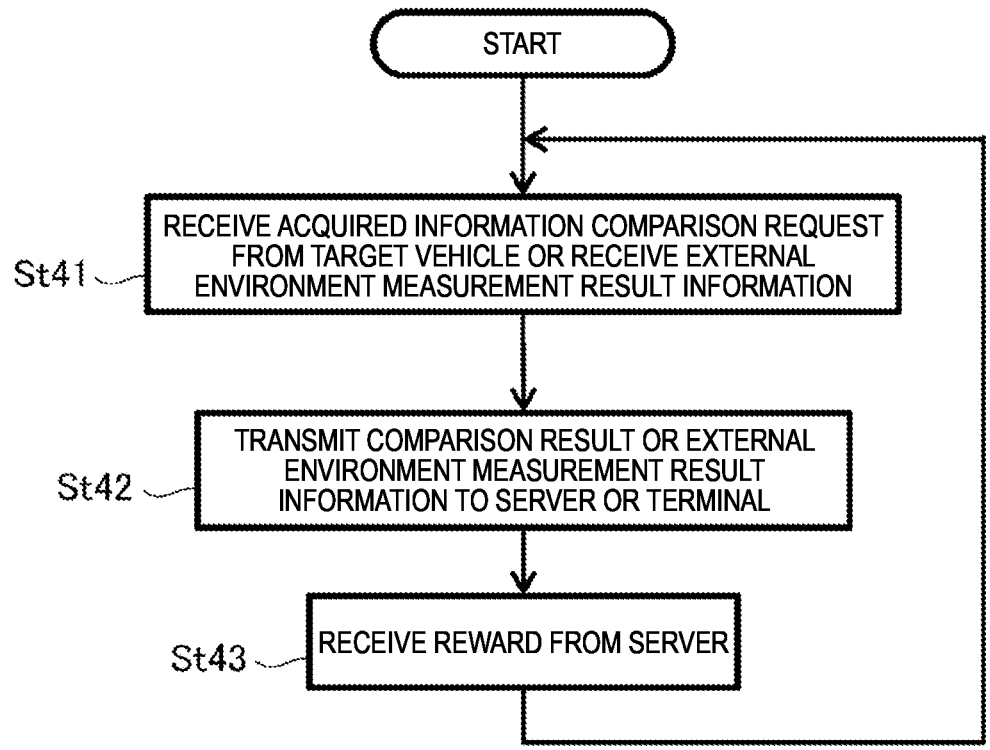
FIG. 10 is a flowchart showing an example of an operation procedure of a peripheral vehicle (vehicle) in time series.
Figure 11:
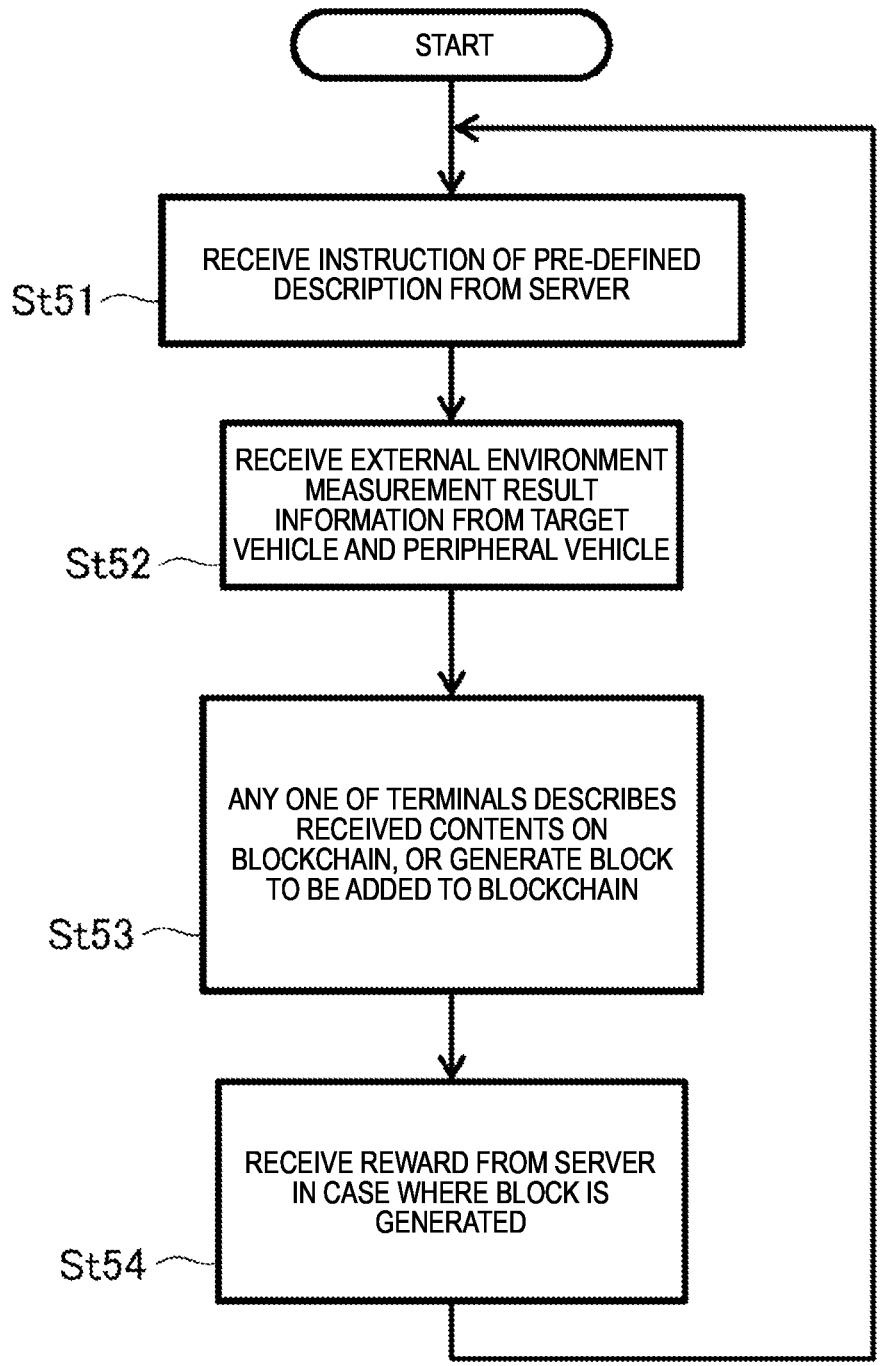
FIG. 11 is a flowchart showing an example of an operation procedure of the terminal in time series.
Figure 12:
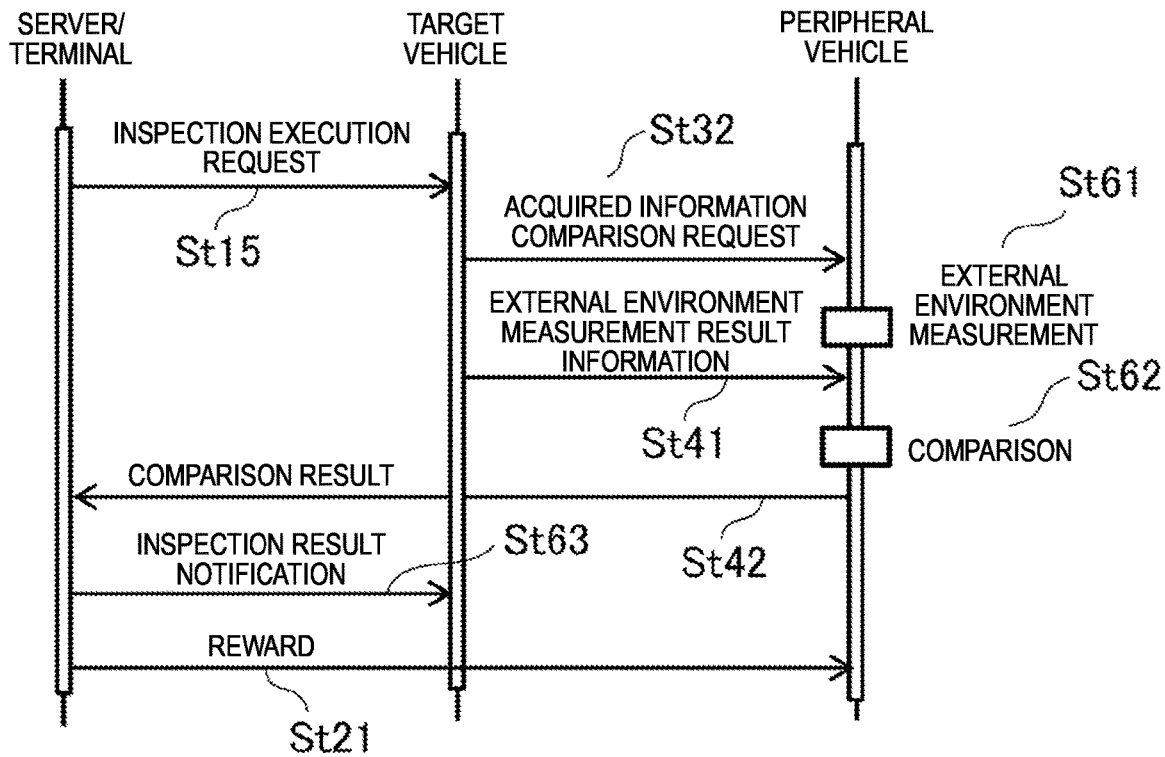
FIG. 12 is a sequence diagram showing an example of an operation procedure of external environment measurement of the peripheral vehicle in time series.
Figure 13:
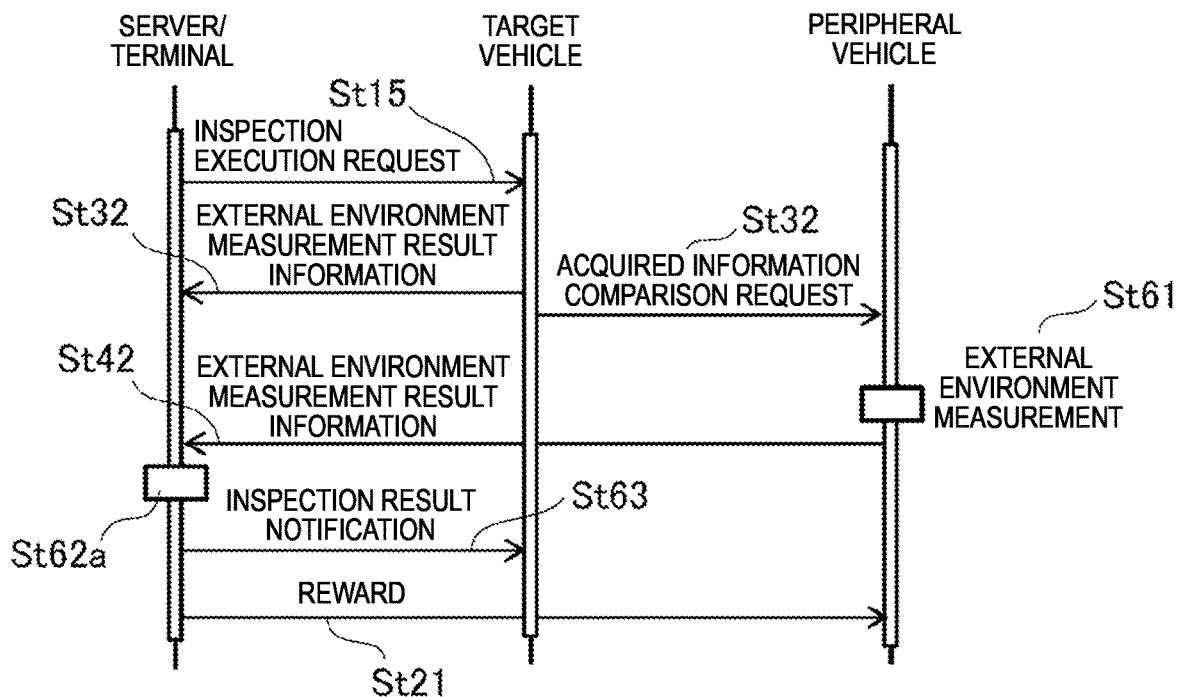
FIG. 13 is a sequence diagram showing an example of an operation procedure of external environment measurement of the server or the terminal in time series.

FIG. 9 is a flowchart showing an example of the operation procedure of the target vehicle (vehicle) in time series. Each process shown in FIG. 9 is executed by the control unit 40 of the target vehicle (that is, any one of the vehicles 31 to 3m). FIG. 10 is a flowchart showing an example of the operation procedure of the peripheral vehicle (that is, the vehicle) in time series. Each process shown in FIG. 10 is executed by the control unit 40 of a peripheral vehicle other than the target vehicle. FIG. 11 is a flowchart showing an example of the operation procedure of the terminals 21 to 2n in time series. Each process shown in FIG. 11 is executed by the processor 15a of at least one terminal among the terminals 21 to 2n. FIG. 12 is a sequence diagram showing an example of an operation procedure of external environment measurement of the peripheral vehicle in time series. FIG. 13 is a sequence diagram showing an example of an operation procedure of external environment measurement of the server 1 or the terminals 21 to 2n in time series.

Hereinafter, a comparison of the external environment measurement result information measured by the target vehicle and the peripheral vehicle includes a pattern executed by the peripheral vehicle (see FIG. 12) and a pattern (see FIG. 13) executed by the server 1 or each of the terminals 21 to 2n (see FIG. 13). Therefore, an example described with reference to FIGS. 9 and 10 as appropriate in description of FIG. 12 and an example described with reference to FIGS. 9 and 10 as appropriate in description of FIG. 13 will be described sequentially.

In FIGS. 12, 9, and 10, the server 1 creates the inspection execution request and notifies the target vehicle (St15). The target vehicle receives the inspection execution request (see FIG. 8) transmitted from the server 1 (St31). The target vehicle notifies the peripheral vehicle of an acquired information comparison request, and transmits the external environment measurement result information measured by the sensor included in its own vehicle to the peripheral vehicle (St32). The acquired information comparison request instructs the comparison between the external environment measurement result information obtained by the target vehicle and the external environment measurement result information obtained by the peripheral vehicle.

Upon receiving the acquired information comparison request transmitted from the target vehicle (St41), the peripheral vehicle measures the external environment information by executing the transaction related to the inspection based on the acquired information comparison request (St61). As a result, the peripheral vehicle can obtain the external environment measurement result information, and can compare the external environment measurement result information obtained by its own vehicle (that is, the peripheral vehicle) with the external environment measurement result information obtained by the target vehicle (St62). The peripheral vehicle transmits a result of the comparison to the server 1 and each of the terminals 21 to 2n (St42).

The server 1 creates the inspection verification notification, the abnormality notification, or the control restriction command, and transmits the same to the target vehicle as an inspection result notification (St63). The target vehicle receives the inspection verification notification, the abnormality notification, or the command of restricting the function (control) of part or all of the sensors included in the target vehicle (that is, the control restriction command) transmitted from the server 1 (St33). After step St33, processing of the target vehicle returns to step St31, and the processes of steps St31 to St33 are repeated.

After step St19 or step St20, the server 1 grants the predetermined reward to part or all of the peripheral vehicles obtaining the external environment measurement result information that coincides the external environment measurement result information of the target vehicle (St21). When the external environment measurement result information that coincides with the external environment measurement result information of the target vehicle is obtained, the peripheral vehicle receives the predetermined reward from the server 1 (St43).

In FIGS. 13, 9, and 10, the server 1 creates the inspection execution request and notifies the target vehicle (St15). The target vehicle receives the inspection execution request (see FIG. 8) transmitted from the server 1 (St31). The target vehicle notifies the peripheral vehicle of the acquired information comparison request, and transmits the external environment measurement result information measured by the sensor included in its own vehicle to the server 1 and each of the terminals 21 to 2n (St32).

Upon receiving the acquired information comparison request transmitted from the target vehicle (St41), the peripheral vehicle measures the external environment information by executing the transaction related to the inspection based on the acquired information comparison request (St61). The peripheral vehicle transmits the external environment measurement result information measured in step St61 to the server 1 and each of the terminals 21 to 2n (St42).

When the external environment measurement result information transmitted from each of the target vehicle and the peripheral vehicle is received, the server 1 performs the comparison of the external environment measurement result information (St62a), and thus determines the inspection result of the target vehicle. The server 1 creates the inspection verification notification, the abnormality notification, or the control restriction command, and transmits the same to the target vehicle as the inspection result notification (St63). The target vehicle receives the inspection verification notification, the abnormality notification, or the command of restricting the function (control) of part or all of the sensors included in the target vehicle (that is, the control restriction command) transmitted from the server 1 (St33). After step St33, the processing of the target vehicle returns to step St31, and the processes of steps St31 to St33 are repeated.

After step St19 or step St20, the server 1 grants the predetermined reward to part or all of the peripheral vehicles obtaining the external environment measurement result information that coincides the external environment measurement result information of the target vehicle (St21). When the external environment measurement result information that coincides with the external environment measurement result information of the target vehicle is obtained, the peripheral vehicle receives the predetermined reward from the server 1 (St43).

In FIG. 11, at least one terminal among the terminals 21 to 2n receives the pre-defined information DF1 transmitted from the server 1 (St51). At least one terminal among the terminals 21 to 2n receives the external environment measurement result information transmitted from and measured by each of the target vehicle and the peripheral vehicle (St52).

After step St52, one terminal among the terminals 21 to 2n which can perform description on the blockchains BKC1 and BKC2 describes the external environment measurement result information, which is received in step St52 and is transmitted from and measured by the target vehicle and the peripheral vehicle, in corresponding blocks of the blockchains BKC1 and BKC2 (St53). Alternatively, one terminal among the terminals 21 to 2n which can perform description on the blockchains BKC1 and BKC2 creates, if necessary, a block to be added to the blockchains BKC1 and BKC2 (St53).

When the block to be added to the blockchains BKC1 and BKC2 is created in step St53, one terminal among the terminals 21 to 2n, which can perform description on the blockchains BKC1 and BKC2, receives the predetermined reward transmitted from the server 1 (St54).

As described above, in the first use case according to Embodiment 1, the server 1 and each of the plurality of vehicles 31 to 3m are communicably connected to each other in the distributed transaction verification system 100. The server 1 holds the blockchains BKC1 and BKC2 in which the transaction information related to the inspection of each of the plurality of vehicles is recorded in the chain manner. The server 1 selects the inspection target vehicle from the plurality of vehicles, creates the transaction information related to the inspection of the selected target vehicle on the blockchains, and transmits the execution instruction of the transaction related to the inspection to the target vehicle. The target vehicle executes the transaction related to the inspection based on the execution instruction, and transmits the execution instruction of the transaction related to the inspection to the peripheral vehicle other than the target vehicle. The server 1 registers the inspection result based on the execution result of the transaction related to the inspection of each of the target vehicle and the peripheral vehicle in the created transaction information related to the inspection of the target vehicle.

As a result, the distributed transaction verification system 100 can manage the execution result of the transaction related to the malfunction inspection of the sensors installed in each of the plurality of nearby vehicles and the detection result of the presence or absence of any sensor malfunction by the blockchains BKC1 and BKC2. Therefore, according to the distributed transaction verification system 100, effectiveness of the transaction executed in the vehicles participating in the distributed transaction verification system 100 can be accurately guaranteed. Further, since the transaction information related to the inspection is recorded in the blockchains BKC1 and BKC2, it is possible to prevent falsification of the execution result of the transaction related to the inspection of the target vehicle selected based on the blockchains BKC1 and BKC 2 from the plurality of nearby vehicles, and thus effectiveness of the inspection result of the target vehicle is ensured. Further, since the transaction information related to the inspection executed by the peripheral vehicle in addition to the target vehicle is also recorded on the blockchains BKC1 and BKC2, it is possible to prevent falsification of the inspection result of the target vehicle.

The processor 15 of the server 1 selects the target vehicle based on the blockchains BKC1 and BKC2. As a result, the server 1 can select the target vehicle by extracting, for example, a vehicle that has not been inspected for a certain period of time, based on the blockchains BKC and BKC2 in which execution history of transactions related to previous inspections is recorded in the chain manner.

The processor 15 of the server 1 creates the information indicating that the inspection result is normal when the majority of the peripheral vehicles have measured the execution result that coincides with the execution result of the transaction related to the inspection of the target vehicle. As a result, the effectiveness of the inspection verification of the target vehicle is easily guaranteed based on the consent (that is, obtaining the same external environment measurement result information) of the majority of the peripheral vehicles other than the target vehicle among the plurality of vehicles 31 to 3m participating in the distributed transaction verification system 100.

The processor 15 of the server 1 receives the execution result of the transaction related to the inspection of each of the target vehicle and the peripheral vehicles, and determines, based on the comparison of the execution results, whether the majority of the peripheral vehicles have measured the execution result that coincides with the execution result of the transaction related to the inspection of the target vehicle. As a result, the server 1 can easily guarantee the effectiveness of the inspection of the target vehicle simply by determining whether the external environment measurement result information obtained by the majority of peripheral vehicles among the (m−1) peripheral vehicles participating in the distributed transaction verification system 100 is the same.

The processor 15 of the server 1 receives the comparison result of the execution result of the transaction related to the inspection of each of the target vehicle and the peripheral vehicles, and determines, based on the comparison result, whether the majority of the peripheral vehicles have measured the execution result that coincides with the execution result of the transaction related to the inspection of the target vehicle. As a result, the server 1 can easily guarantee the effectiveness of the inspection of the target vehicle simply by determining the comparison result of whether the external environment measurement result information obtained by the majority of peripheral vehicles among the (m−1) peripheral vehicles participating in the distributed transaction verification system 100 is the same.

The processor 15 of the server 1 creates the information indicating that the inspection result is abnormal when the minority of the peripheral vehicles have measured the execution result that coincides with the execution result of the transaction related to the inspection of the target vehicle. As a result, the server 1 can easily determine that the inspection of the target vehicle is abnormal simply by determining whether the external environment measurement result information obtained by the majority of the peripheral vehicles among the (m−1) peripheral vehicles participating in the distributed transaction verification system 100 is not the same.

The processor 15 of the server 1 transmits the use restriction command of the function of the target vehicle related to the abnormality via the communication circuit 14 to the target vehicle. As a result, the server 1, for example, prevents the target vehicle from using the sensor specified by the control restriction command during the self-driving, so that the probability that the target vehicle will cause a traffic violation or a traffic accident can be reduced.

The processor 15 of the server 1 grants the predetermined reward to the majority of the peripheral vehicles that have measured the execution result that coincides with the execution result of the transaction related to the inspection of the target vehicle. As a result, since an incentive is ensured for the peripheral vehicles, significance of participation of the vehicles in the distributed transaction verification system 100 is appropriately improved.

Each of the vehicles 31 to 3m is a vehicle that constitutes the distributed transaction verification system 100 including the server 1, and includes the communication circuit 45 configured to communicate with the server 1 which holds the blockchains BKC1 and BKC2 in which the transaction information related to the inspection of the vehicle is recorded in the chain manner. Each of the vehicles 31 to 3m includes the control unit 40 configured to control an operation including driving of the host vehicle. When the host vehicle is selected as the inspection target vehicle, the communication circuit 45 receives the execution instruction of the transaction related to the inspection. The control unit 40 controls the execution of the transaction related to the inspection based on the execution instruction, and controls the operation including the driving of the host vehicle based on the inspection result which is based on the execution result of the transaction related to the inspection of the host vehicle and the execution result of the transaction related to the inspection of other vehicles (that is, the plurality of peripheral vehicles).

As a result, according to the distributed transaction verification system 100, the inspection verification of the sensor included in the vehicle can be simply and easily issued between the target vehicle and the peripheral vehicles. As described above, the change is achieved from the centralized type that issues the certificate of vehicle inspection completion at the existing vehicle inspection site to the decentralized type that allows the issue of the inspection verification according to the vehicle inspection verification as the service of the individual or the private company, so that it is possible to execute the inspection of vehicle abnormalities in a shorter cycle than before, and to verify that a vehicle (for example, a self-driving vehicle) is normal.

Each of the vehicles 31 to 3m further includes at least one sensor which serves as the target of the inspection. The control unit 40 receives, as the transaction related to the inspection, the measurement result of surrounding external environment information measured by the sensor during traveling along a predetermined travel route. As a result, since each of the vehicles 31 to 3m (either the target vehicle or the peripheral vehicle) performs the same measurement of the surrounding external environment information along the same travel route, it is possible to easily implement the inspection of the target vehicle.

Figure 14:
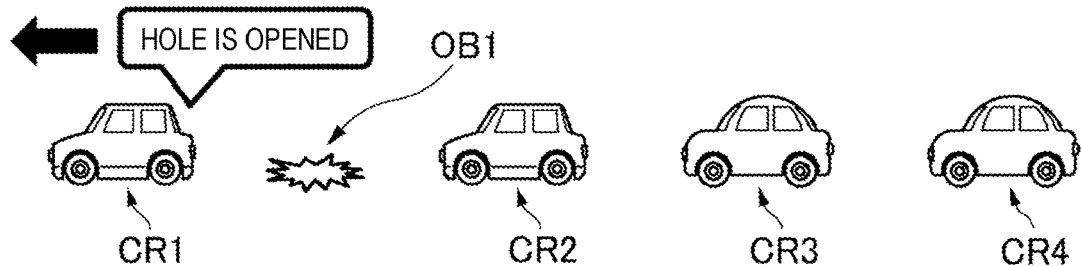
FIG. 14 is an explanatory diagram showing an operation outline example of a second use case of the distributed transaction verification system.
Figure 14:
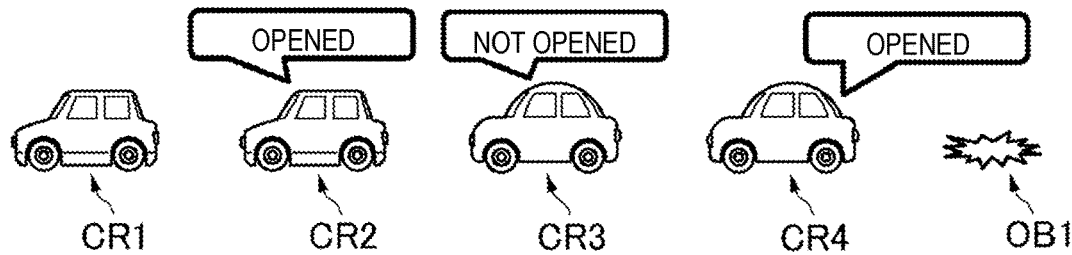
Figure 14:
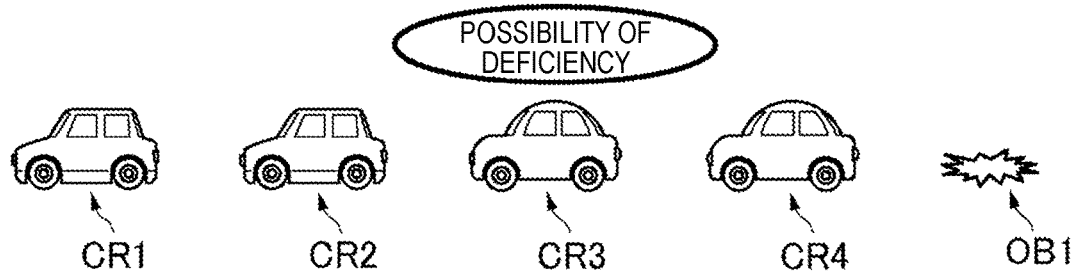
Figure 14:
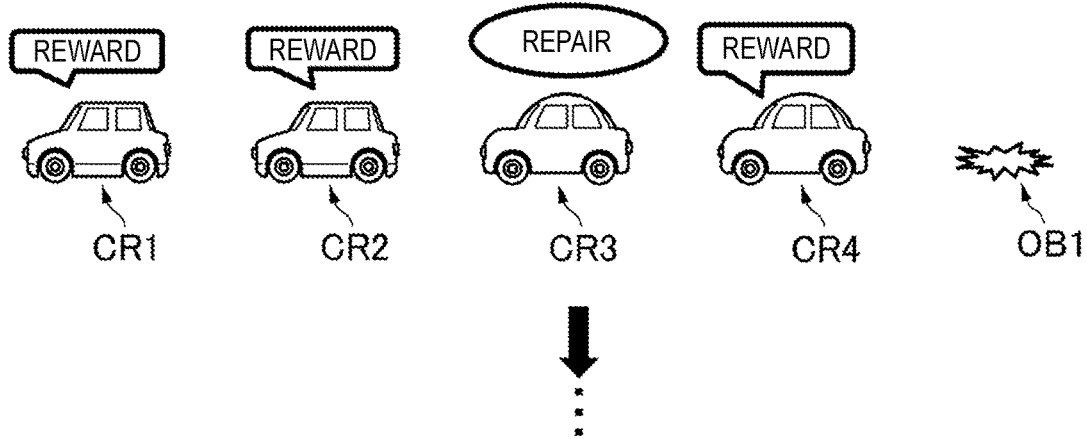
Figure 15:
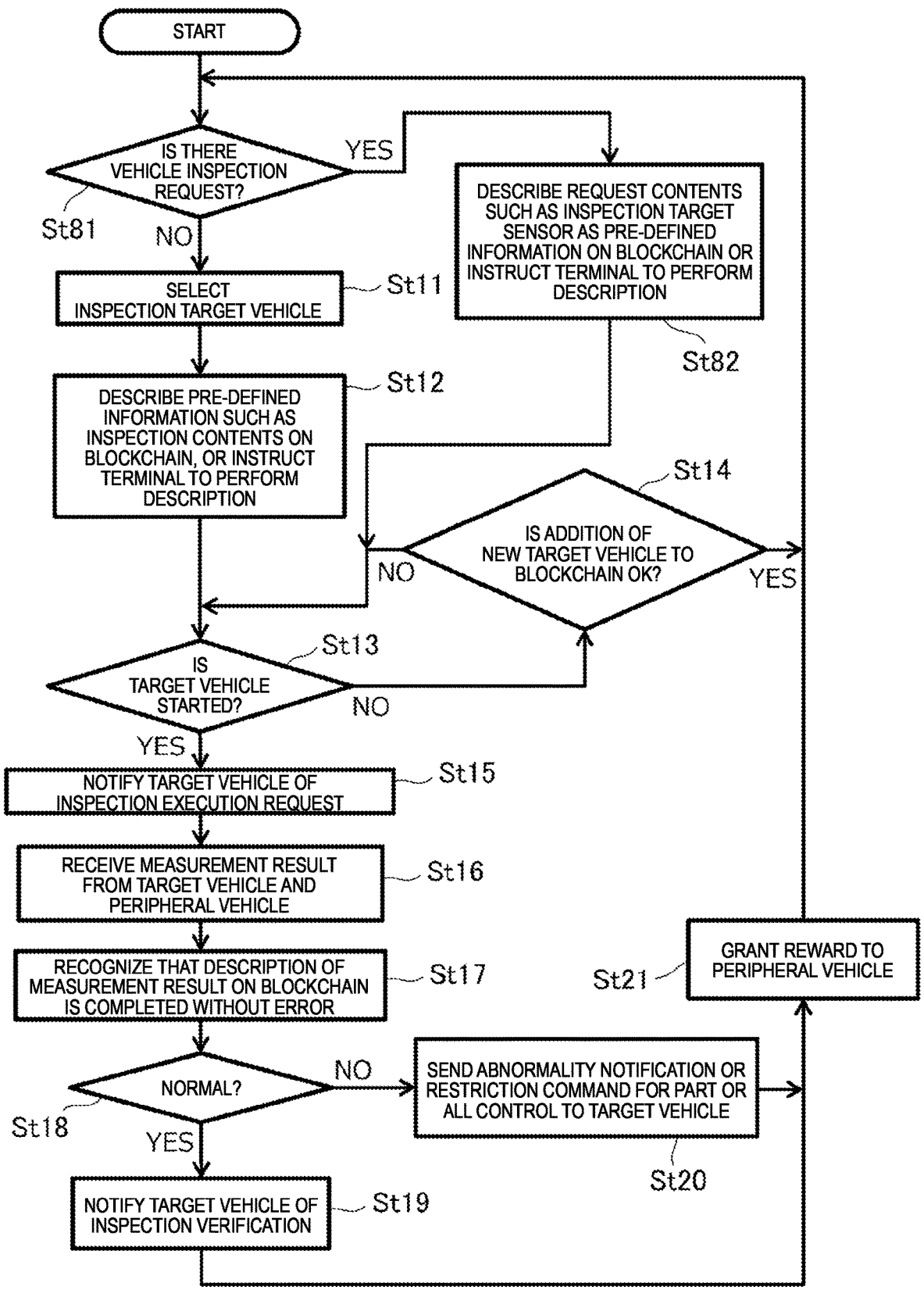
FIG. 15 is a flowchart showing an example of an operation procedure of the server corresponding to the second use case in time series.

(Second Use Case) FIG. 14 is an explanatory diagram showing an operation outline example of a second use case of the distributed transaction verification system 100. FIG. 15 is a flowchart showing an example of an operation procedure of a server corresponding to the second use case in time series. FIG. 16 is an explanatory diagram showing an example of updating map data.

In the second use case, for example, when any one of the vehicles participating in the distributed transaction verification system 100 detects an event for selection of the target vehicle in the first use case, it is inquired whether the same event can be detected in the other peripheral vehicles. An example of the event is detection of an obstacle that is not present in map data (that is, not registered as data). However, the event is not limited thereto. When it is determined that the majority of the peripheral vehicles have detected the same event, information on the obstacle is additionally registered in the map data, and a series of transaction information is registered on the blockchains BKC1 and BKC2 in the same manner as in the first use case. In the second use case, each of the vehicles 31 to 3m participating in the distributed transaction verification system 100 records and holds the map data described above in the memory 46.

In FIG. 14, first, the vehicle CR1 detects the obstacle (for example, a hole OB1 in a road) that is not present in the map data (that is, not registered as data) (St71). The vehicle CR1 travels ahead of the other vehicles CR2, CR3, and CR4. Travel states of the vehicles CR1 to CR4 are recognized in the server 1. The vehicle CR1 reports to the server 1 that the obstacle (for example, the hole OB1) is detected. In the distributed transaction verification system 100, the server 1 inquires, based on the report from the vehicle CR1, following vehicles of the vehicle CR1 (that is, the vehicles CR2 to CR4) of credibility of the obstacle detection report from the vehicle CR1 (St72). Each of the vehicles CR2 to CR4 detects presence or absence of the obstacle (for example, the hole OB1) in response to an inquiry request from the server 1, and reports a result of the detection to the server 1. For example, it is assumed that the vehicles CR2 and CR4 can detect the hole OB1 while the vehicle CR3 cannot detect the hole OB1.

When a majority of normal detection results are obtained based on the reports of the vehicles CR1 to CR4 (in other words, when the majority of the vehicles have obtained detection results that coincide with the detection result of the vehicle CR1), the server 1 performs registration on the blockchains BKC1 and BKC2 so as to ensure effectiveness of the detection report of the vehicle CR1, and instructs each of the vehicles CR1 to CR4 to update the map data so as to newly add the information on the obstacle (for example, the hole OB1) (St73). For example, as shown in FIG. 16, map data MPD1 before update holds obstacle data MP1 and MP2 of obstacles existing on a map, and then obstacle data MP3 related to the obstacle (for example, the hole OB1) newly detected in step St71 is newly added by step St73. The obstacle data MP3 added to updated map data MPD1a includes, for example, point information (that is, position information) of the hole OB1, a type of the obstacle, and area information indicating a size of the obstacle.

The server 1 may temporarily suspend the update of the map data (see above) for the vehicle CR3 that cannot obtain the detection result that coincides with the detection result of the vehicle CR1. The server 1 recognizes a possibility that a malfunction (for example, a failure) may have occurred in a sensor installed on the vehicle CR3 (St73).

As described above, the server 1 or each of the terminals 21 to 2n creates transaction information corresponding to transactions of the vehicles CR1 to CR4 (that is, detection confirmation of the hole OB1 which is not present in the map data) and registers the transaction information on the blockchains BKC1 and BKC2 (St74). The server 1 grants the predetermined reward to the vehicles (specifically, the vehicles CR2 and CR4) capable of detecting the obstacle (for example, the hole OB1) (St74). After recognizing the possibility that the malfunction (for example, the failure) may have occurred in the sensor installed on the vehicle CR3, the server 1 transmits the control restriction command to the vehicle CR3 so as to restrict use of the vehicle CR3, and selects the vehicle CR3 as the inspection target vehicle in the same manner as in the first use case (St74). Upon receiving the control restriction command from the server 1, the vehicle CR3 creates an inspection request and transmits the inspection request to the server 1. Processing in a case where the vehicle CR3 is selected as the inspection target vehicle is the same as that of the first use case described above, and a description thereof will be omitted.

Next, an operation procedure of the server 1 of the distributed transaction verification system 100 according to the second use case will be described with reference to FIG. 15. Each process shown in FIG. 15 is executed by the processor 15 of the server 1. In descriptions of operations of each of the target vehicle, the peripheral vehicles, and the terminals 21 to 2n according to the second use case, descriptions of the same contents as those of the first use case will be simplified or omitted, and different contents will be described. In the description of FIG. 15, the same processes as those of the operation of the server 1 according to the first use case are denoted by the same step numbers, and descriptions thereof will be simplified or omitted while different contents will be described.

In FIG. 15, the server 1 determines whether the vehicle inspection request is received from the plurality of vehicles 31 to 3m participating in the distributed transaction verification system 100 (St81). In the example shown in FIG. 14, the inspection request is transmitted from the vehicle CR3, which cannot detect the hole OB1, to the server 1. When the vehicle inspection request is not received (St81, NO), the server 1 selects the inspection target vehicle based on the blockchains BKC1 and BKC2 in the same manner as in the first use case (St1*l*).

On the other hand, when the server 1 receives the vehicle inspection request (St81, YES), blocks corresponding to the target vehicle which makes the inspection request (the vehicle CR3 in the example of FIG. 14) and the other peripheral vehicles (the vehicles CR1, CR2, and CR4 in the example of FIG. 14) are newly created and added (registered) to the blockchains BKC1 and BKC2. The server 1 describes the pre-defined information DF1 which includes request contents (such as the sensor to be inspected), the target vehicle information TRG1, and the peripheral vehicle information ASS1 in the blocks added to the blockchains BKC1 and BKC2, or selects one of the terminals 21 to 2n so as to instruct the description of the pre-defined information DF1, the target vehicle information TRG1, and the peripheral vehicle information ASS1 (St82). After step St82, processing of the server 1 proceeds to step St13.

In FIG. 15, when the number of held blocks corresponding to the target vehicle determined to have not been started in step St13 is less than the tolerance corresponding to the tolerance information (St14, YES), the server 1 determines whether any inspection request is received from the other vehicles (St81).

As described above, in the second use case according to Embodiment 1, in the distributed transaction verification system 100, the processor 15 of the server 1 inquires, via the communication circuit 14, whether the event can be detected, based on the detection of the event detected by any one of the plurality of vehicles, in the peripheral vehicles other than the any one vehicle. The processor 15 transmits, based on a normal detection notification of the event detected by the majority of the vehicles, a registration instruction of data corresponding to the event to each of the plurality of vehicles via the communication circuit 14. As a result, according to the distributed transaction verification system 100, the credibility of the detection result can be confirmed through using the plurality of nearby vehicles with the detection of the event serving as a trigger. Unregistered data which is not known until the detection of the event can be properly registered when presence of the credibility is obtained. Since it is also possible to prevent the falsification of the execution result of the transaction related to the inspection of the target vehicle, the effectiveness of the inspection result of the target vehicle is ensured.

The processor 15 of the server 1 also selects the vehicle that cannot detect the event as the target vehicle. As a result, since there is a possibility that a sensor malfunction (for example, a failure) occurs in the vehicle that cannot detect the event, the server 1 can set the vehicle suspected of the failure as the inspection target vehicle at an early stage.

The event refers to the detection of the obstacle that is not present in the map data held by each of the plurality of vehicles. The processor 15 of the server 1 receives the information on the obstacle that is not present in the map data, and transmits, to each of the plurality of vehicles via the communication circuit 14, the update instruction to update the information on the obstacle to the map data. As a result, according to the distributed transaction verification system 100, when the obstacle that is not present in the map data is found, the information on the obstacle can be promptly registered, and a shape of the road or the like can be safely grasped during self-driving of each of the vehicles 31 to 3m such that probability of traffic accidents or traffic violations can be adaptively reduced.

Although various embodiments have been described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments mentioned above may be combined as desired in the range without departing from the spirit of the invention.

Although roles of the server 1 and the terminals 21 to 2n constituting the distributed transaction verification system 100 are different in Embodiment 1 described above, for example, the server 1 may also be operated as a terminal similar to the terminals 21 to 2n, and any one of the terminals 21 to 2n may be operated in the same manner as the server 1 since the server 1 and the terminals 21 to 2n have the same configuration. As a result, a device that has special authority (role) as the server 1 is not provided, and the server 1 and the terminals 21 to 2n constituting the distributed transaction verification system 100 have the same authority such that the distributed transaction verification system 100 can be configured in an equal manner.

The present application is based on Japanese Patent Application No. 2018-155600 filed on Aug. 22, 2018, the contents of which are incorporated by reference in the present application.

The invention claimed is:

1. A server which constitutes a distributed transaction verification system comprising a plurality of vehicles, the server comprising:
 a memory configured to hold a blockchain in which transaction information related to an inspection of each of the plurality of vehicles is recorded in a chain manner;
 a processor configured to select a target vehicle of inspection from the plurality of vehicles and add transaction information related to an inspection of the selected target vehicle to the blockchain; and
 a communication circuit configured to transmit an execution instruction of a transaction related to the inspection to the target vehicle,
 wherein the processor registers an inspection result in the added transaction information related to the inspection of the target vehicle, the inspection result being based on an execution result of the transaction related to the inspection of the target vehicle based on the execution instruction and an execution result of a transaction related to the inspection of at least one peripheral vehicle other than the target vehicle.

2. The server according to claim 1,
 wherein the processor selects the target vehicle based on the blockchain.

3. The server according to claim 1,
 wherein the processor creates information indicating that the inspection result is normal if a majority of the at least one peripheral vehicle has measured the execution result that coincides with the execution result of the transaction related to the inspection of the target vehicle.

4. The server according to claim 3,
 wherein the processor receives the execution results of the transaction related to the inspection of the target vehicle and each of the at least one peripheral vehicle, and determines, based on a comparison of the execution results, whether the majority of the at least one peripheral vehicle has measured the execution result that coincides with the execution result of the transaction related to the inspection of the target vehicle.

5. The server according to claim 3,
 wherein the processor receives comparison results of the execution results of the transaction related to the inspection of the target vehicle and each of the at least one peripheral vehicle, and determines, based on the comparison results, whether the majority of the at least one peripheral vehicle has measured the execution result that coincides with the execution result of the transaction related to the inspection of the target vehicle.

6. The server according to claim 1,
 wherein the processor creates information indicating that the inspection result is abnormal if a minority of the at least one peripheral vehicle has measured the execution result that coincides with the execution result of the transaction related to the inspection of the target vehicle.

7. The server according to claim 6,
 wherein the processor transmits a function use restriction command of the target vehicle related to the abnormality via the communication circuit to the target vehicle.

8. The server according to claim 1,
 wherein the processor grants a predetermined reward to a majority of the at least one peripheral vehicle that has measured the execution result that coincides with the execution result of the transaction related to the inspection of the target vehicle.

9. The server according to claim 1,
 wherein the processor inquires, based on detection of an event detected by one of the plurality of vehicles, of vehicles other than the one of the plurality of vehicles about whether the event is detected, and transmits, based on a normal detection notification of the event detected by a majority of the vehicles other than the one of the plurality of vehicles, a registration instruction of data corresponding to the event to each of the plurality of vehicles via the communication circuit.

10. The server according to claim 9,
 wherein the processor selects, as the target vehicle, a vehicle which has not detected the event.

11. The server according to claim 9,
 wherein the event refers to detection of an obstacle that is not present in map data held by each of the plurality of vehicles, and wherein the processor receives information on the obstacle that is not present in the map data, and transmits an update instruction to each of the plurality of vehicles via the communication circuit to update the map data about the information on the obstacle.

12. The server according to claim 1,
wherein the blockchain comprises a plurality of blocks connected in time-series, the plurality of blocks comprises transaction information of respective target vehicles, and
wherein each of the transaction information of respective target vehicles is associated with transaction information of the at least one peripheral vehicle obtained based on the execution instruction to a corresponding target vehicle.

13. A vehicle which constitutes a distributed transaction verification system comprising a server, the vehicle comprising:
a communication circuit configured to communicate with the server which holds a blockchain in which transaction information related to an inspection of the vehicle is recorded in a chain manner; and
a processor configured to control an operation comprising driving of a host vehicle,
wherein if the host vehicle is selected as a target vehicle of an inspection,
the communication circuit receives an execution instruction of a transaction related to the inspection, and
the processor controls execution of the transaction related to the inspection based on the execution instruction, and controls the operation comprising the driving of the host vehicle based on an inspection result, the inspection result being based on an execution result of the transaction related to the inspection of the host vehicle and an execution result of a transaction related to the inspection of another vehicle.

14. The vehicle according to claim 13, further comprising:
at least one sensor which serves as a target of the inspection,
wherein the processor receives, as the transaction related to the inspection, a measurement result of surrounding external environment information measured by the at least one sensor during traveling along a predetermined travel route.

15. The vehicle according to claim 13,
wherein if the host vehicle is selected as a target vehicle of an inspection,
the communication circuit receives the execution instruction from the server, and
in response to reception of the execution instruction through the communication circuit, the processor transmits the execution instruction to the another vehicle via the communication circuit.

16. The vehicle according to claim 15,
wherein if the host vehicle is selected as a target vehicle of an inspection,
the processor transmits, in addition to the execution instruction, the execution result of the host vehicle to the another vehicle via the communication circuit.

17. The vehicle according to claim 13,
wherein if the another vehicle is selected as a target vehicle of an inspection,
the communication circuit receives the execution instruction from the target vehicle,
the processor transmits the execution result of the host vehicle to the server via the communication circuit.

18. The vehicle according to claim 13,
wherein if the another vehicle is selected as a target vehicle of an inspection,
the communication circuit receives the execution instruction and the execution result of the target vehicle from the target vehicle,
the processor compares the execution result of the host vehicle with the execution result of the target vehicle, and transmits a comparison result to the server via the communication circuit.

19. A distributed transaction verification system in which a server and a plurality of vehicles are connected to communicate with each other,
wherein the server
holds a blockchain in which transaction information related to an inspection of each of the plurality of vehicles is recorded in a chain manner, and
selects a target vehicle of inspection from the plurality of vehicles, creates transaction information related to an inspection of the selected target vehicle on the blockchain, and transmits an execution instruction of a transaction related to the inspection to the target vehicle,
wherein the target vehicle executes the transaction related to the inspection based on the execution instruction, and transmits the execution instruction of the transaction related to the inspection to at least one peripheral vehicle other than the target vehicle, and
wherein the server registers an inspection result based on an execution result of the transaction related to the inspection of each of the target vehicle and the at least one peripheral vehicle in the created transaction information related to the inspection of the target vehicle.

20. A distributed transaction verification method using a distributed transaction verification system in which a server and a plurality of vehicles are connected to communicate with each other, the distributed transaction verification method comprising:
holding a blockchain in which transaction information related to an inspection of each of the plurality of vehicles is recorded in a chain manner;
selecting a target vehicle of inspection from the plurality of vehicles;
creating transaction information related to an inspection of the selected target vehicle on the blockchain and transmitting an execution instruction of a transaction related to the inspection to the target vehicle;
executing the transaction related to the inspection based on the execution instruction and transmitting the execution instruction of the transaction related to the inspection to at least one peripheral vehicle other than the target vehicle; and
registering an inspection result based on an execution result of the transaction related to the inspection of each of the target vehicle and the at least one peripheral vehicle in the created transaction information related to the inspection of the target vehicle.

* * * * *